(12) United States Patent
Gritti

(10) Patent No.: US 11,988,647 B2
(45) Date of Patent: May 21, 2024

(54) COMBINATION MIXER ARRANGEMENT FOR NOISE REDUCTION IN LIQUID CHROMATOGRAPHY

(71) Applicant: Waters Technologies Corporation, Milford, MA (US)

(72) Inventor: Fabrice Gritti, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 427 days.

(21) Appl. No.: 17/358,391

(22) Filed: Jun. 25, 2021

(65) Prior Publication Data
US 2022/0011276 A1 Jan. 13, 2022

Related U.S. Application Data

(60) Provisional application No. 63/081,524, filed on Sep. 22, 2020, provisional application No. 63/048,684, filed on Jul. 7, 2020.

(51) Int. Cl.
*G01N 30/06* (2006.01)
*G01N 30/16* (2006.01)
*G01N 30/02* (2006.01)

(52) U.S. Cl.
CPC ............ *G01N 30/06* (2013.01); *G01N 30/16* (2013.01); *G01N 2030/027* (2013.01)

(58) Field of Classification Search
CPC ... G01N 30/06; G01N 30/16; G01N 2030/027
See application file for complete search history.

(56) References Cited

U.S. PATENT DOCUMENTS

| 3,595,531 A | 7/1971 | Williams et al. |
| 3,830,369 A | 8/1974 | Pfadenhauer |

(Continued)

FOREIGN PATENT DOCUMENTS

| CN | 203061073 U | 7/2013 |
| CN | 203385703 U | 1/2014 |

(Continued)

OTHER PUBLICATIONS

International Search Report and Written Opinion in PCT/US2022/028299 dated Aug. 2, 2022.

(Continued)

*Primary Examiner* — Lisa M Caputo
*Assistant Examiner* — Alex T Devito
(74) *Attorney, Agent, or Firm* — Schmeiser, Olsen & Watts LLP; Victor J. Baranowski

(57) ABSTRACT

A mixer arrangement for use in a chromatography system includes a first frequency targeting mixer including a first flow channel coupled between an inlet and an outlet and a second flow channel coupled between the inlet and the outlet, the second flow channel including a volume offset region configured to delay fluid propagation through the second flow channel, wherein the volume offset region is configured to reduce or eliminate fluidic compositional oscillations in a compositional solvent stream that depart from a desired composition at a first target frequency, and a residual noise targeting mixer fluidically connected in series to the frequency targeting mixer, the residual noise targeting mixer configured to dampen aperiodic baseline noise in the compositional solvent stream.

20 Claims, 19 Drawing Sheets

(56) References Cited

U.S. PATENT DOCUMENTS

| | | | |
|---|---|---|---|
| 4,311,586 A | 1/1982 | Baldwin et al. | |
| 4,437,812 A | 3/1984 | Abu-Shumays et al. | |
| 4,475,821 A | 10/1984 | Koch et al. | |
| 4,496,245 A | 1/1985 | Conrad et al. | |
| 4,506,987 A | 3/1985 | Daughton et al. | |
| 4,534,659 A | 8/1985 | Dourdeville et al. | |
| 4,842,730 A | 6/1989 | James et al. | |
| 4,882,062 A | 11/1989 | Moeller et al. | |
| 4,882,063 A | 11/1989 | Allington et al. | |
| 4,954,253 A | 9/1990 | Alexandrov et al. | |
| 5,275,723 A | 1/1994 | Greenley et al. | |
| 5,423,661 A | 6/1995 | Gabeler et al. | |
| 5,656,034 A | 8/1997 | Kochersperger et al. | |
| 5,664,938 A | 9/1997 | Yang | |
| 5,738,783 A | 4/1998 | Shirota et al. | |
| 5,846,411 A | 12/1998 | Harter et al. | |
| 5,887,977 A | 3/1999 | Morikawa | |
| 5,904,424 A | 5/1999 | Schwesinger et al. | |
| 5,918,976 A | 7/1999 | Hashimoto et al. | |
| 6,048,496 A | 4/2000 | Zhou et al. | |
| 6,116,869 A | 9/2000 | Couillard et al. | |
| 6,170,981 B1 | 1/2001 | Regnier et al. | |
| 6,190,034 B1 | 2/2001 | Nielsen et al. | |
| 6,319,469 B1 | 11/2001 | Mian et al. | |
| 6,629,775 B2 | 10/2003 | Choikhet et al. | |
| 6,705,357 B2 | 3/2004 | Jeon et al. | |
| 6,845,787 B2 | 1/2005 | Karp et al. | |
| 6,851,846 B2 | 2/2005 | Fujii et al. | |
| 6,883,559 B2 | 4/2005 | Jeon et al. | |
| 6,887,384 B1 | 5/2005 | Frechet et al. | |
| 6,916,113 B2 | 7/2005 | Van de Goor et al. | |
| 6,919,046 B2 | 7/2005 | O'Connor et al. | |
| 6,942,792 B2 | 9/2005 | Aso | |
| 6,958,119 B2 | 10/2005 | Yin et al. | |
| 6,981,522 B2 | 1/2006 | O'Connor et al. | |
| 6,987,263 B2 | 1/2006 | Hobbs et al. | |
| 6,991,729 B2 | 1/2006 | Ikeda et al. | |
| 7,048,512 B2 | 5/2006 | Couillard et al. | |
| 7,105,304 B1 | 9/2006 | Nikiforov et al. | |
| 7,111,501 B2 | 9/2006 | Rocklin et al. | |
| 7,112,277 B2 | 9/2006 | Bidlingmeyer et al. | |
| 7,147,364 B2 | 12/2006 | Oohashi et al. | |
| 7,178,386 B1 | 2/2007 | Gamble et al. | |
| 7,204,139 B2 | 4/2007 | Takayama | |
| 7,207,345 B2 | 4/2007 | Somerville | |
| 7,241,423 B2 | 7/2007 | Golbig et al. | |
| 7,278,329 B2 | 10/2007 | Weissgerber et al. | |
| 7,314,070 B2 | 1/2008 | Jeon et al. | |
| 7,390,121 B2 | 6/2008 | Jahn et al. | |
| 7,744,762 B2 | 6/2010 | Lazar | |
| 7,887,753 B2 | 2/2011 | Quake et al. | |
| 7,976,779 B2 | 7/2011 | Tai et al. | |
| 8,329,407 B2 | 12/2012 | Ismagilov et al. | |
| 8,511,889 B2 | 8/2013 | Choikhet et al. | |
| 8,517,597 B2 | 8/2013 | Shreve et al. | |
| 8,622,609 B2 | 1/2014 | Shreve et al. | |
| 8,696,193 B2 | 4/2014 | Herbstritt | |
| 8,764,279 B2 | 7/2014 | Castro et al. | |
| 8,894,274 B2 | 11/2014 | Shreve et al. | |
| 8,979,358 B2 | 3/2015 | Wiechers | |
| 9,126,164 B2 | 9/2015 | Shreve et al. | |
| 9,128,071 B2 | 9/2015 | Tsukada et al. | |
| 9,527,010 B2 | 12/2016 | Williams et al. | |
| 9,528,968 B2 | 12/2016 | Murphy et al. | |
| 9,557,317 B2 | 1/2017 | Ozbal | |
| 9,566,537 B2 | 2/2017 | Geng | |
| 9,636,646 B2 | 5/2017 | Neerincx et al. | |
| 9,645,123 B2 | 5/2017 | Angelosanto et al. | |
| 9,679,757 B2 | 6/2017 | Netto et al. | |
| 9,766,217 B2 | 9/2017 | Kidal et al. | |
| 9,791,107 B2 | 10/2017 | Witt et al. | |
| 9,884,266 B2 | 2/2018 | Dauphas et al. | |
| 9,945,820 B2 | 4/2018 | Albrecht, Jr. | |
| 9,968,894 B2 | 5/2018 | Shreve | |
| 9,970,908 B2 | 5/2018 | Yotani et al. | |
| 9,987,604 B2 | 6/2018 | Baaske et al. | |
| 10,088,459 B2 | 10/2018 | Onoda et al. | |
| 10,238,989 B2 | 3/2019 | Luongo et al. | |
| 10,247,673 B2 | 4/2019 | Peterman et al. | |
| 10,295,512 B2 | 5/2019 | Pohl et al. | |
| 10,335,753 B2 | 7/2019 | De Corral et al. | |
| 2002/0063060 A1 | 5/2002 | Gascoyne et al. | |
| 2003/0077204 A1 | 4/2003 | Seki et al. | |
| 2003/0123322 A1 | 7/2003 | Chung et al. | |
| 2003/0156952 A1 | 8/2003 | Couillard et al. | |
| 2004/0042340 A1 | 3/2004 | Aso | |
| 2004/0092033 A1 | 5/2004 | Gustafson et al. | |
| 2004/0096867 A1 | 5/2004 | Andersson et al. | |
| 2004/0109793 A1 | 6/2004 | McNeely et al. | |
| 2005/0118070 A1 | 6/2005 | Griss et al. | |
| 2005/0252840 A1 | 11/2005 | Arnold et al. | |
| 2006/0011548 A1 | 1/2006 | Yin et al. | |
| 2006/0039829 A1 | 2/2006 | Suk et al. | |
| 2006/0171864 A1 | 8/2006 | Caze et al. | |
| 2006/0273012 A1 | 12/2006 | Dehmer | |
| 2006/0280029 A1 | 12/2006 | Garstecki et al. | |
| 2006/0285433 A1 | 12/2006 | Yang et al. | |
| 2007/0148048 A1 | 6/2007 | Jousse | |
| 2009/0142846 A1 | 6/2009 | Crenshaw et al. | |
| 2009/0207687 A1 | 8/2009 | Kemperman et al. | |
| 2009/0255601 A1 | 10/2009 | Baeuerle et al. | |
| 2009/0268548 A1 | 10/2009 | Hartmann et al. | |
| 2010/0159573 A1 | 6/2010 | Chung et al. | |
| 2010/0189602 A1 | 7/2010 | Baeuerle et al. | |
| 2011/0113866 A1 | 5/2011 | Finlay | |
| 2011/0192217 A1 | 8/2011 | Choikhet et al. | |
| 2012/0309648 A1 | 12/2012 | Tseng et al. | |
| 2014/0061133 A1 | 3/2014 | Herman | |
| 2014/0230528 A1 | 8/2014 | Wang et al. | |
| 2014/0251448 A1 | 9/2014 | Witt et al. | |
| 2014/0334251 A1 | 11/2014 | Shreve | |
| 2014/0345372 A1 | 11/2014 | Gerhardt et al. | |
| 2015/0059451 A1 | 3/2015 | Witt et al. | |
| 2015/0132789 A1* | 5/2015 | Bornheimer | G01N 21/31 356/40 |
| 2016/0161454 A1 | 6/2016 | Jones et al. | |
| 2016/0266078 A1 | 9/2016 | Onoda et al. | |
| 2017/0173496 A1 | 6/2017 | Stone | |
| 2017/0333898 A1 | 11/2017 | Saleh et al. | |
| 2018/0056252 A1 | 3/2018 | Steele et al. | |
| 2018/0088091 A1 | 3/2018 | Cormier et al. | |
| 2019/0070571 A1 | 3/2019 | Jackson et al. | |
| 2019/0070572 A1 | 3/2019 | MacKinnon et al. | |
| 2019/0170706 A1 | 6/2019 | Gilar et al. | |
| 2019/0265206 A1 | 8/2019 | Tarafder | |
| 2019/0337211 A1 | 11/2019 | Kazmer | |
| 2019/0383777 A1 | 12/2019 | Inoue | |
| 2020/0023295 A1 | 1/2020 | Moeller et al. | |
| 2020/0025723 A1 | 1/2020 | Gilar et al. | |
| 2020/0276728 A1 | 9/2020 | Zeko et al. | |
| 2021/0156829 A1 | 5/2021 | Raymond et al. | |

FOREIGN PATENT DOCUMENTS

| | | |
|---|---|---|
| CN | 204116295 U | 1/2015 |
| CN | 106166453 A | 11/2016 |
| CN | 106422832 A | 6/2017 |
| CN | 106902662 A | 6/2017 |
| CN | 104076112 B | 9/2018 |
| CN | 109173766 A | 1/2019 |
| CN | 209333548 U | 9/2019 |
| CN | 110394105 A | 11/2019 |
| DE | 19840026 A1 | 3/1999 |
| DE | 19902697 A1 | 7/2000 |
| DE | 19840026 C2 | 11/2000 |
| DE | 10307507 B4 | 9/2013 |
| DE | 102015100693 A1 | 7/2016 |
| DE | 102018104840 A1 | 4/2018 |
| DE | 102018104842 A1 | 4/2018 |
| EP | 1566215 A2 | 8/2005 |
| EP | 1788388 A1 | 5/2007 |
| FR | 2768189 A1 | 3/1999 |
| FR | 2836185 A1 | 8/2003 |
| FR | 3075068 A1 | 6/2019 |

(56) References Cited

FOREIGN PATENT DOCUMENTS

| | | |
|---|---|---|
| GB | 2332378 B | 12/2001 |
| GB | 2389629 B | 12/2005 |
| GB | 2524608 B | 4/2020 |
| JP | S5994064 A | 5/1984 |
| JP | S62210042 A | 9/1987 |
| JP | H02167469 A | 6/1990 |
| JP | H06324026 A | 11/1994 |
| JP | H07159388 A | 6/1995 |
| JP | 2587162 Y2 | 12/1998 |
| JP | H02170047 A | 6/1999 |
| JP | 2603770 Y2 | 3/2000 |
| JP | 3665680 B2 | 6/2005 |
| JP | 2006003203 A | 1/2006 |
| JP | 3780917 B2 | 5/2006 |
| JP | 2006122735 A | 5/2006 |
| JP | 3865119 B2 | 1/2007 |
| JP | 3959436 B2 | 8/2007 |
| JP | 4082309 B2 | 4/2008 |
| JP | 2009018311 A | 1/2009 |
| JP | 4348820 B2 | 10/2009 |
| JP | 4360206 B2 | 11/2009 |
| JP | 4683066 B2 | 5/2011 |
| JP | 5427603 B2 | 2/2014 |
| KR | 20020085903 A | 11/2002 |
| WO | 1997000125 A1 | 1/1997 |
| WO | 0022436 A1 | 4/2000 |
| WO | 0196024 A2 | 12/2001 |
| WO | 0221121 A1 | 3/2002 |
| WO | 2003015890 A1 | 2/2003 |
| WO | 2003024598 A1 | 3/2003 |
| WO | 2003098218 A1 | 11/2003 |
| WO | 2006017039 A1 | 2/2006 |
| WO | 2007021755 A2 | 2/2007 |
| WO | 2010015238 A1 | 2/2010 |
| WO | 2010030720 A1 | 3/2010 |
| WO | 2010107677 A1 | 3/2010 |
| WO | 2010083884 A1 | 7/2010 |
| WO | 2011003412 A2 | 1/2011 |
| WO | 2011037530 A1 | 3/2011 |
| WO | 2013013717 A2 | 1/2013 |
| WO | 2013159816 A1 | 10/2013 |
| WO | 2013187916 A1 | 12/2013 |
| WO | 2014034259 A1 | 3/2014 |
| WO | 2016082520 A1 | 6/2016 |
| WO | 2018191787 A1 | 10/2018 |
| WO | 2018226907 A2 | 12/2018 |
| WO | 2019086671 A1 | 5/2019 |
| WO | 2019097490 A1 | 5/2019 |
| WO | 2019167011 A4 | 9/2019 |
| WO | 2019186223 A1 | 10/2019 |
| WO | 2019204508 A1 | 10/2019 |
| WO | 2019229819 A1 | 12/2019 |
| WO | 2019240653 A1 | 12/2019 |
| WO | 2020099865 A1 | 5/2020 |

OTHER PUBLICATIONS

International Search Report and Written Opinion in PCT/US2022/030670 dated Sep. 23, 2022.
Non-Final Office Action in U.S. Appl. No. 17/358,360 dated Sep. 15, 2022.
International Preliminary Report on Patentability in PCT/US2022/028299 dated Nov. 30, 2023.
Notice of Allowance in U.S. Appl. No. 17/358,360 dated Sep. 20, 2023.
International Search Report and Written Opinion in PCT/US2021/039058 dated Oct. 14, 2021.
International Search Report and Written Opinion in PCT/US2021/039065 dated Oct. 19, 2021.
International Preliminary Report on Patentability in International Application No. PCT/US2021/039058, dated Jan. 19, 2023.
International Preliminary Report on Patentability in International Application No. PCT/US2021/039065, dated Jan. 19, 2023.
Final Office Action in U.S. Appl. No. 17/358,360 dated Feb. 28, 2023.
"HyperShear(TM) HPLC and UHPLC Mixers" 2014, Analytical Scientific Instruments US, Inc.
Chen, et al. "Combining selection valve and mixing chamber for nanoflow gradient generation: Toward developing a liquid chromatography cartridge coupled with mass spectrometer for protein and peptide analysis." Analytica Chimica Acta 887 (2015) pp. 230-236.
Davis, et al. "A Sample, Reliable Rapid-Mixing Apparatus for Continuous-Flow Studies," Analytical Biochemistry 97 (1979) pp. 428-437.
Huft, et al. "Microfluidic Integration of Paralell Solid-Phase Liquid Chromatography," Analytical Chemistry 85 (2013) 2999-3005.
Shi, et al., "Mixing enhancement via a serpentine micromixer for real-time activation of carboxyl," Chemical Engineering Journal, 2019. https://doi.org/10.1016/j.cej.2019.123642.
Gilbert, Scott "Lab-on-a-chip miniaturized on-line liquid chromatography," Crystal Vision Microsystems, CPAC Satellite Workshop, Rome, Italy, Mar. 20-22, 2006.
"Dynamic Mixing Chamber Manual V.7119-1," Knauer, Berlin, Germany, Aug. 2016.
"HPLC Gradient Mixers," Mott, 2020. https://mottcorp.com/product/mixers/hplc-gradient-static-mixers/.
Ianovska, et al. "Development of small-volume microfluidic chaotic mixers for future application in two-dimensional liquid chromatography," RSC Adv., Jul. 2017, pp. 9090-9099.
Al Lawati, et al. "Combination of capillary micellar liquid chromatography with on-chip microfluidic chemiluminescence detection for direct analysis of buspirone in human plasma," Talanta 127 (2014) pp. 230-238.
Qian, Shizhi and Haim H. Bau, "Magneto-hydrodynamics based microfluidics," Mechanics Research Communications 36 (2009) 10-21.
Steele, et al. "Reducing HPLC/UHPLC System Noise and Volume with High Performance Static Mixers, " Feb. 26, 2017, Mott Corporation.
"Varian Dual Chamber Dynamic Mixer Instruction Manual," Varian, Publication No. 0391467400, Issue 5, Feb. 2009.
"Appropriate Mixer Volume for HPLC and UHPLC Applications," Oct. 11, 2014. https://hplctips.blogspot.com/2014/10/appropriate-mixer-volume-for-hplc-and.html.
"Reliable Solvent Mixing in UHPLC," Thermo Fisher Scientific, Inc., 2016.
Chisolm, et al. "Development and characterization of 'push-pull' sampling device with fast reaction quenching coupled to high-performance liquid chromatography for pharmaceutical process analytical technologies," Journal of Chromatography A 1217 (2010) 7471-7477.
Engelhardt, Heinz and Helmut Elgass, "Problems in the application of gradient elution to high-pressure liquid chromatography," Journal of Chromatography 112 (1975) pp. 415-423.
Kaminski, et al. "Programming the Elution Gradient in High-Performance Chromatography by Varying the Volume of the Mixing Chambers," Journal of Chromatography 176 (1979) pp. 171-180.
Kostanyan, Artak E. and Andrei A. Voshkin, "Support-free pulsedliquid-liquid chromatogrpahy," Journal of Chromatography A 1216 (2009) pp. 7761-7766.
Takeuchi, Toyohide and Daido Ishii, "Continuous Gradient Elution in Micro High-Performance Liquid Chromatography," Journal of Chromatography 253 (1982) pp. 41-47.
Wang, et al. "On-line two-dimensional countercurrent chromatography x high performance liquid chromatography system with a novel fragmentarydilution and turbulent mixing interface for preparation of coumarinsfrom Cnidium monnieri" Journal of Chromatography A, 1406 (2015) pp. 215-223.
International Preliminary Report on Patentability in PCT/US2022/030670 mailed on Jan. 4, 2024.

\* cited by examiner

COMBINATION MIXER ARRANGEMENT FOR NOISE REDUCTION IN LIQUID CHROMATOGRAPHY

RELATED APPLICATIONS

This application claims the benefit of the earlier filing date of U.S. Provisional Patent Application Ser. No. 63/048,684, filed Jul. 7, 2020, and titled "Mixer for Liquid Chromatography," and U.S. Provisional Patent Application No. 63/081,524 filed Sep. 22, 2020, and titled "Combination Mixer Arrangement for Noise Reduction in Liquid Chromatography," the entireties of which are incorporated herein by reference.

FIELD OF THE INVENTION

The invention relates generally to chromatography. More particularly, the invention relates to a mixer arrangement for use in chromatography systems for minimizing noise generated by an upstream pump.

BACKGROUND

Chromatography is a set of techniques for separating a mixture into its constituents. Well-established separation technologies for fluid chromatography systems include HPLC (High Performance Liquid Chromatography), UPLC (Ultra Performance Liquid Chromatography) and SFC (Supercritical Fluid Chromatography). HPLC systems use high pressure, ranging traditionally between 1,000 psi (pounds per square inch) to approximately 6,000 psi, to generate the flow required for liquid chromatography (LC) in packed columns. Compared to HPLC, UPLC systems use columns with smaller particulate matter and higher pressures approaching 20,000 psi to deliver the mobile phase. SFC systems use highly compressible mobile phases, which typically employ carbon dioxide ($CO_2$) as a principle component.

In many of these fluid chromatography applications, it is desirable to mix fluids that are flowing continuously. For example, in liquid chromatography, a pump is used to deliver precise compositions of solvents to a chromatographic column for the purpose of separating liquid mixtures. The flow composition delivered by the pump can vary in time, and it is desirable to blend or mix the stream as it flows for the purpose of smoothing out compositional discontinuities that can cause interference with sample detection. In most cases, liquid chromatography systems operate in a laminar flow regime, where turbulence is not available to aid in mixing, and mixers require creative designs to promote controlled dispersion. Various mixers exist which seek to achieve a desirable mixing of fluids in liquid chromatography systems. For example, large volume mixers exist that mix effectively, but do so with an increase in volume which must be flown-through by a fluid or solvent, thereby drastically increasing testing time and diminishing throughput. In contrast, packed-bead LC mixers are inefficient relative to their delay volume, are difficult to manufacture, and are prone to contamination and clogging.

Testing has shown that one of the dominant sources of compositional noise is due to the pump stroke. Since liquid chromatography pumps tend to be piston or syringe style positive displacement pumps, flow is delivered into the system in discrete strokes. Within a given stroke, the volume of solvent is often fairly well-mixed, but there tends to be a discontinuity in composition between strokes, and under certain chromatographic conditions this results in noise introduced at the stroke frequency of the pump. This noise can decrease the precision of sample quantification and render some samples undetectable.

Thus, a mixer that eliminates or reduces the above described deficiencies would be well received in the art.

SUMMARY

In one exemplary embodiment, a mixer arrangement for use in a chromatography system comprises: a first frequency targeting mixer including a first flow channel coupled between an inlet and an outlet and a second flow channel coupled between the inlet and the outlet, the second flow channel including a volume offset region configured to delay fluid propagation through the second flow channel, wherein the volume offset region is configured to reduce or eliminate fluidic compositional oscillations in a compositional solvent stream that depart from a desired composition at a first target frequency; and a residual noise targeting mixer fluidically connected in series to the frequency targeting mixer, the residual noise targeting mixer configured to dampen aperiodic baseline noise in the compositional solvent stream.

Additionally or alternatively, the mixer arrangement further includes a second frequency targeting mixer including a first flow channel coupled between an inlet and an outlet and a second flow channel coupled between the inlet and the outlet, the second flow channel including a volume offset region configured to delay fluid propagation through the second flow channel, wherein the volume offset region is configured to reduce or eliminate fluidic compositional oscillations in the compositional solvent stream that depart from a desired composition at a second target frequency that is different than the first target frequency, and wherein the second frequency targeting mixer is fluidically connected in series to the first frequency targeting mixer.

Additionally or alternatively, the residual noise targeting mixer is includes a dispersion structure having a plurality of flow channels creating flow direction anisotropy.

Additionally or alternatively, the residual noise targeting mixer includes a mixing disk having an inlet face and an outlet face located between the plurality of flow channels, wherein the mixing disk includes a dispersive medium having a random porous structure.

Additionally or alternatively, the residual noise targeting mixer is located in a downstream arrangement relative to the first frequency targeting mixer.

Additionally or alternatively, the first flow channel of the first frequency targeting mixer includes a first flow restrictor region having a hydraulic resistance substantially representing the hydraulic resistance of the first flow channel, and wherein the second flow channel includes a second flow restrictor region fluidically connected in series with the volume offset region, the second flow restrictor region having a hydraulic resistance substantially representing the hydraulic resistance of the second flow channel.

Additionally or alternatively, the volume of the residual noise targeting mixer is between 1 and 2 times the noise volume of the aperiodic baseline noise in the compositional solvent stream.

In another exemplary embodiment, a fluid chromatography system comprises: at least one solvent reservoir; at least one pump connected to the at least one solvent reservoir configured to pump a compositional solvent stream from the at least one solvent reservoir downstream; a mixer arrangement located downstream from the at least one pump, the mixer arrangement including: a first frequency targeting mixer including a first flow channel coupled between an inlet and an outlet and a second flow channel coupled between the inlet and the outlet, the second flow channel including a volume offset region configured to delay fluid propagation through the second flow channel, wherein the volume offset region is configured to reduce or eliminate fluidic compositional oscillations in a compositional solvent stream that depart from a desired composition at a first target frequency; and a residual noise targeting mixer fluidically connected in series to the frequency targeting mixer, the residual noise targeting mixer configured to dampen aperiodic baseline noise in the compositional solvent stream; a sample injector downstream from the mixer arrangement configured to inject a sample into the outlet flow of the solvent; a chromatography column downstream from the sample injector configured to perform separation of the sample; and a detector downstream from the chromatography column.

Additionally or alternatively, the first target frequency is a high frequency noise related to a full stroke volume of the at least one pump.

Additionally or alternatively, the volume offset region of the first frequency targeting mixer is approximately one quarter of the full stroke volume of the at least one pump.

Additionally or alternatively, the mixer arrangement further comprises: a second frequency targeting mixer including a first flow channel coupled between an inlet and an outlet and a second flow channel coupled between the inlet and the outlet, the second flow channel including a volume offset region configured to delay fluid propagation through the second flow channel, wherein the volume offset region is configured to reduce or eliminate fluidic compositional oscillations in the compositional solvent stream that depart from a desired composition at a second target frequency that is different than the first target frequency, and wherein the second frequency targeting mixer is fluidically connected in series to the first frequency targeting mixer.

Additionally or alternatively, the second frequency targeting mixer is fluidically connected downstream from the first frequency targeting mixer and upstream from the residual noise targeting mixer, and wherein the second target frequency is a low frequency residual noise that remains after the first frequency targeting mixer reduces or eliminates fluidic compositional oscillations.

Additionally or alternatively, the residual noise targeting mixer is configured to dampen aperiodic baseline noise in the compositional solvent stream by at least one of: smoothing residual noise related to the high frequency noise corresponding to the full stroke volume of the at least one pump; and further dampening the amplitude of the low frequency residual noise.

Additionally or alternatively, the residual noise targeting mixer is includes a dispersion structure having a plurality of flow channels creating flow direction anisotropy.

Additionally or alternatively, the residual noise targeting mixer includes a mixing disk having an inlet face and an outlet face located between the plurality of flow channels, wherein the mixing disk includes a dispersive medium having a random porous structure.

Additionally or alternatively, the residual noise targeting mixer is located downstream from the first frequency targeting mixer.

Additionally or alternatively, the first flow channel of the first frequency targeting mixer includes a first flow restrictor region having a hydraulic resistance substantially representing the hydraulic resistance of the first flow channel, and wherein the second flow channel includes a second flow restrictor region fluidically connected in series with the volume offset region, the second flow restrictor region having a hydraulic resistance substantially representing the hydraulic resistance of the second flow channel.

Additionally or alternatively, the volume of the residual noise targeting mixer is between 1 and 2 times the full stroke volume of the at least one pump.

In another exemplary embodiment, a method of mixing fluid in a fluid chromatography system comprises: providing a compositional solvent stream, by at least one fluidic pump, to a mixer arrangement that includes a first frequency targeting mixer and a residual noise targeting mixer; receiving, by the first frequency targeting mixer, the compositional solvent stream; reducing or eliminating, by the first frequency targeting mixer, fluidic compositional oscillations in a compositional solvent stream that depart from a desired composition at a first target frequency; receiving the fluid by the residual noise targeting mixer fluidically connected in series to the frequency targeting mixer; and dampening, by the residual noise targeting mixer, aperiodic residual baseline noise in the compositional solvent stream.

Additionally or alternatively, the mixer arrangement further includes a second frequency targeting mixer fluidically connected in series to the first frequency targeting mixer, and the method further comprises: receiving, by the second frequency targeting mixer, the compositional solvent stream; and reducing or eliminating, by the second frequency targeting mixer, fluidic compositional oscillations in the compositional solvent stream that depart from a desired composition at a second target frequency that is different than the first target frequency.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Figure 1:
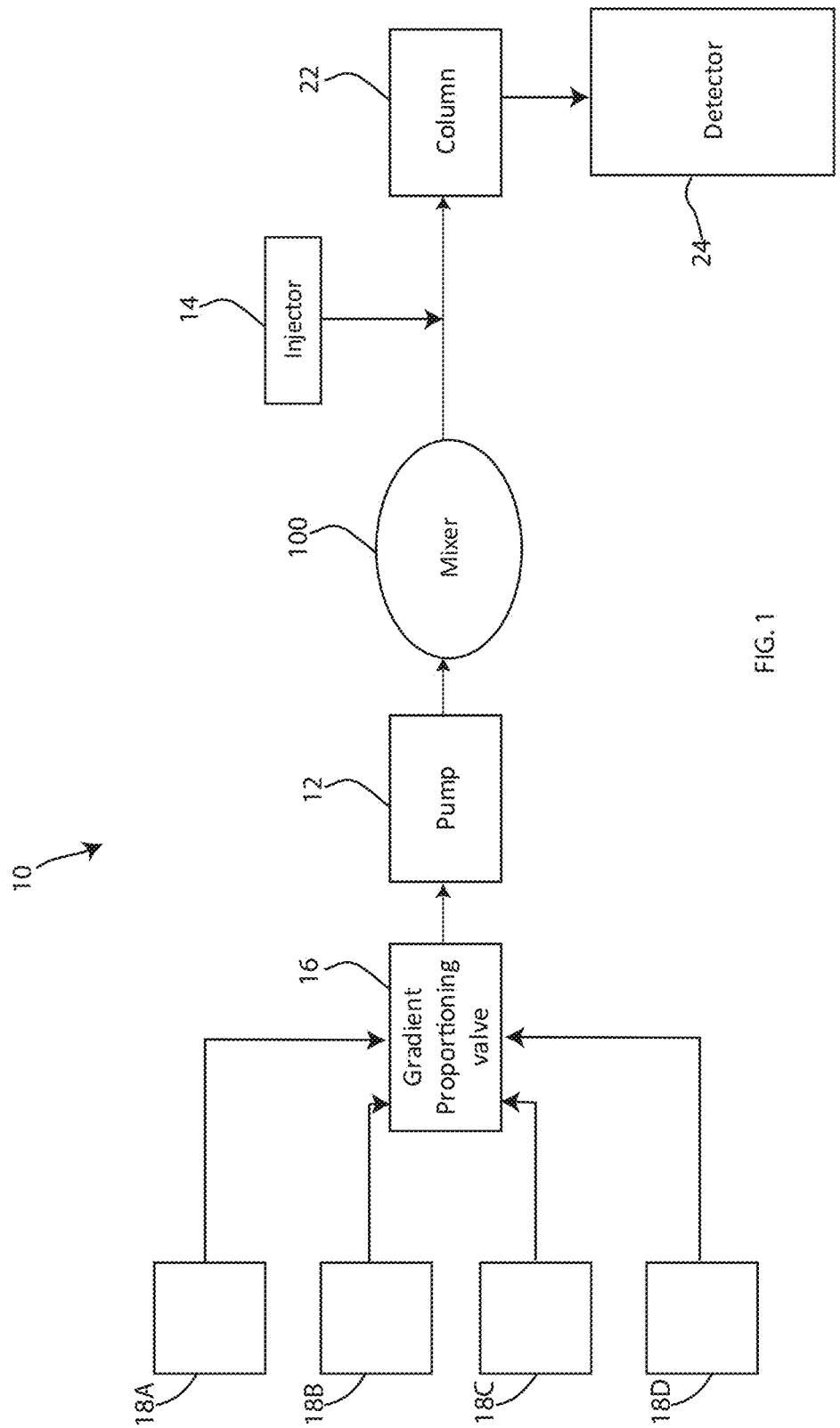
FIG. 1 depicts a block diagram of an embodiment of a liquid chromatography system having a mixer arrangement, in accordance with one embodiment.

Reference in the specification to "one embodiment" or "an embodiment" means that a particular, feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

As used herein, a mobile phase is a solvent or mixture of solvents used to carry a sample and to pass through the stationary phase of a liquid chromatography system. The mobile phase may be a gradient mobile phase in which the composition of the mobile phase changes with time. The mobile phase may also be referred to herein as the system flow which typically flows from the source of the mobile phase to at least the detector of the liquid chromatography system.

In brief overview, the invention relates to a mixer arrangement for use in chromatography systems that minimizes noise generated upstream. The mixer arrangement includes at least two separate components—one or more frequency targeting mixers coupled in series with one or more passive residual noise targeting mixers.

The mixer arrangements consistent with the present invention may further be configured to cancel and/or otherwise reduce fluidic oscillations in composition that depart from a desired composition by one or more frequencies. For example, in cases described herein, one or more pumps (e.g. a single quaternary pump or two binary pumps) located upstream from the mixer arrangements embodied by the present invention may be configured to pump fluid downstream to the mixer. However, prior to mixing by the mixer arrangements embodied by the present invention, the composition expelled by the pump is not sufficiently mixed. Depending on the pump, the composition downstream from the pump oscillate from a desired composition, referred to in the art as "compositional ripple." Such unwanted compositional variance may occur at frequencies dependent on the upstream pump system being used, and may become known to a chromatography system designer such that the mixer arrangements embodied by the present invention may be particularly configured to cancel or reduce one or more the frequencies in composition ripple or variance in accordance with embodiments described herein below.

Mixers described herein may be configured to reduce or cancel this unwanted compositional ripple whether the pump is set to pump a constant amount of solvent, or alternatively set to deliver a gradient. In either situation, there is a desired composition at a given point in time. Any departure from that desired composition, in the form of a compositional oscillation at a given frequency, is unwanted and may be prevented by the mixers described herein.

The mixer arrangements embodied by the present invention are also configured to reduce low frequency noise generated by a quaternary pump and/or two binary pumps in a liquid chromatography system. This problem may be particularly detrimental in reverse phase HPLC gradient with acetonitrile/water mobile phase mixtures containing 0.1% trifluoroacetic acid. Such a mobile phase causes a significant loss in signal-to-noise ratio, decrease in number of peaks detected, and incomplete identification of compounds present in complex sample mixtures identification. Thus, the mixer arrangements embodied by the present invention are configured to prevent these problems by reducing loss in signal-to-noise ratio, increase the number of peaks detected, and increase identification of compounds present in complex sample mixtures identification.

Thus, embodiments of the present invention are configured to reduce the overall amplitude of quasi-periodic, low frequency, baseline signal noise by coupling in series one or more split-flow mixers for interference destruction of the periodic noise with a residual noise reducing mixer, such as a disk shaped mixer, for dampening noise amplitude after the destructive interference.

FIG. 1 depicts a block diagram of an embodiment of a liquid chromatography system 10 having a mixer arrangement 100, in accordance with one embodiment. The liquid chromatography system 10 can be an HPLC, UPLC, or the like. The liquid chromatography system 10 includes a solvent delivery system that includes a plurality of solvent reservoirs 18A, 18B, 18C, 18D. The solvent reservoirs are connected to a gradient proportioning valve 16 which provides the combined solvents to a quaternary pump 12. The quaternary pump 12 draw solvents through a fluidic conduit, which may be a fluidic conduit, line, tube or channel.

While not shown, other embodiments of the liquid chromatography system 10 contemplated may be a binary pump system having two binary pumps (i.e. using a binary solvent manager BSM system). Thus, the present invention may be included in a BSM system including two high pressure mixing pumps in which frequencies due to the pump cycle cause flow perturbations. In such instances, the frequencies of unwanted compositional fluctuations may be fixed in these BSM systems. Hereinafter, while the quaternary pump 12 is shown, it should be understood that the mixers described herein, and concepts described herein, are applicable to BSM systems as well as quaternary solvent manager (QSM) systems.

The quaternary pump 12 may have a single pair of pump heads and alter the composition via a switching valve upstream of the pump 12. The quaternary pump 12 may be configured to deliver up to four different solvents (as shown, solvents from reservoirs 18A, 18B, 18C, 18D) with the switching valve. Compositional ripple as described herein occurs because only one solvent is delivered at a time to the quaternary pump 12 by the gradient proportioning valve 16. The valve 16 alternates between the solvents rapidly to achieve the commanded composition. However, the solvents may not fully blend in the pump heads. Additionally, during a gradient where the set composition is changing over time, each pump stroke has a different composition. Thus, the quaternary pump 12 in this case creates an undesirable staircase-shaped delivered composition curve that needs additional mixing for proper detection downstream.

Downstream from the quaternary pump 12 is the mixer arrangement 100. The mixer arrangement 100 may be configured to passively mix the pumped fluid in accordance to the embodiments described herein. While the specific features of mixer arrangement 100 is shown in FIG. 2 and described herein below, the liquid chromatography system 10 can include any mixer consistent with the mixer arrangement embodiments described herein.

Downstream from the mixer arrangement 100 is shown an injector 14. The injector 14 may be included as a feature of a sample manager or other assembly or sub-system configured to inject a sample into the flow of fluid coming from the mixer arrangement 100. The injector 14 may include an injector valve with a sample loop. The sample manager may control the injection of the sample and may operate in one of two states: a load state and an injection state. In the load state, the position of the injector valve of the injector 14 is such that the solvent manager loads the sample into the sample loop; in the injection state, the position of the injector valve of the injector 14 changes so that solvent manager introduces the sample in the sample loop into the continuously flowing mobile phase arriving from the mixer arrangement 100.

With the injector valve of the injector 14 in the injection state, the mobile phase carries the sample into a column 22. The chromatography column 22 is in fluidic communication with the injector 14 through, for example, a fluidic tube. The chromatography column 22 may be configured to perform sample separation according to techniques known in the art. Another fluidic tube couples the output port of the column 22 to a detector 24, for example, a mass spectrometer, a UV detector, or any other detector. Through the fluidic tube, the detector 24 may be configured to receive the separated components of the sample from the column 22 and produce an output from which the identity and quantity of analytes of the sample may be determined. Noise in the absorbance of the separated components over time may be reduced by the mixers described herein.

The liquid chromatography system 10 is shown for exemplary purposes, and the various features shown may be modified, changed or replaced with any features of any known liquid chromatography system without departing from the scope of the invention. For Furthermore, while the invention is shown by way of example with a liquid chromatography system, mixers described herein may be deployed with any fluidic system, including supercritical fluid chromatography (SFC) systems or even non-chromatography applications.

In one exemplary embodiment of the liquid chromatography system 10 shown above, two solvents are delivered from each of solvent reservoirs 18A and 18B. The other solvent reservoirs 18C and 18D may not be used in this embodiment. The solvent from reservoir 18A may be water with 0.1% trifluoroacetic acid (TFA). The solvent from reservoir 18B may be acetonitrile (ACN) with 0.1% TFA. In such an embodiment, more TFA sticks to the column when solvent from reservoir 18A passes through, less sticks when solvent from reservoir 18B passes through. In this manner, oscillations in the composition will cause the amount of TFA leaving the column to oscillate. The TFA in the compositions absorbs light at the wavelength the detector 24 is observing. Thus, the mixer arrangement 100 is configured to prevent noise waves seen in the baseline of the chromatogram that would otherwise be present if unwanted oscillations in the composition, or "compositional ripple" was present. Such oscillations would interfere with the quantification of the size of sample peaks and thereby are desirable to prevent by the mixer arrangement 100 in accordance with embodiments described herein.

Figure 2A:
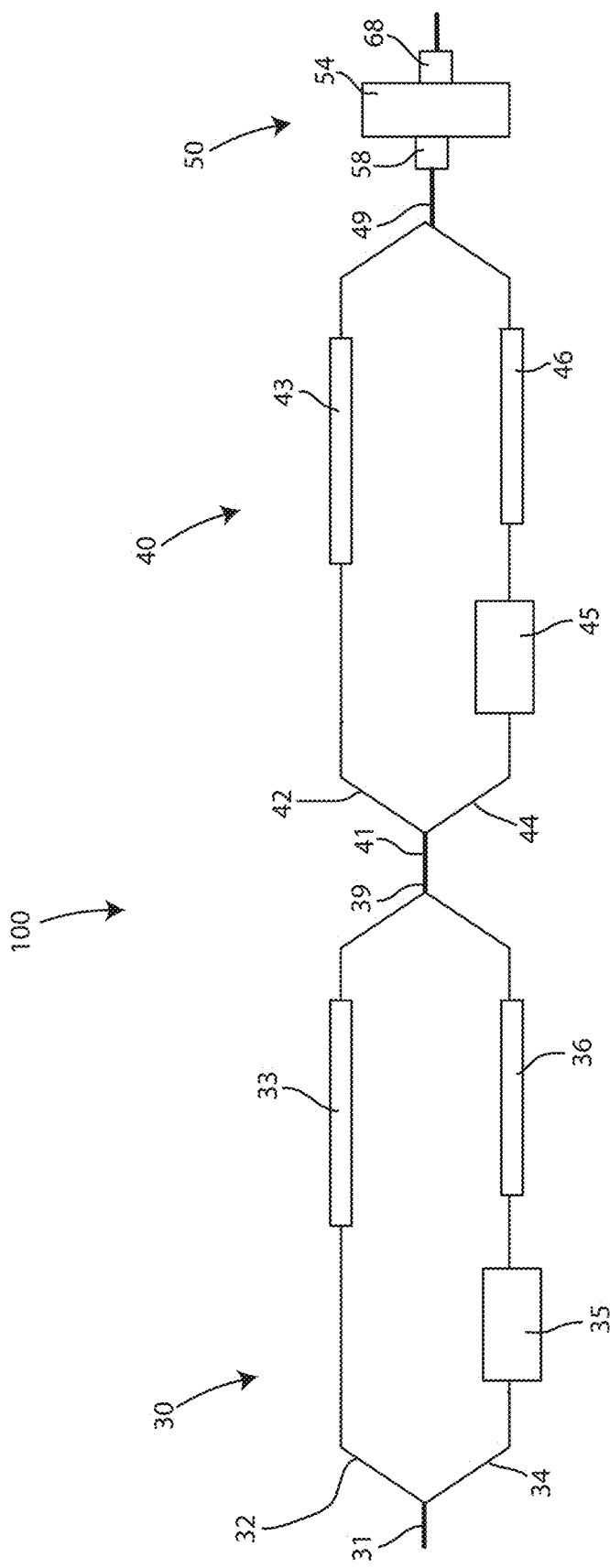
FIG. 2A depicts a schematic diagram of an embodiment of the mixer arrangement of the liquid chromatography system of FIG. 1, in accordance with one embodiment.
Figure 2B:
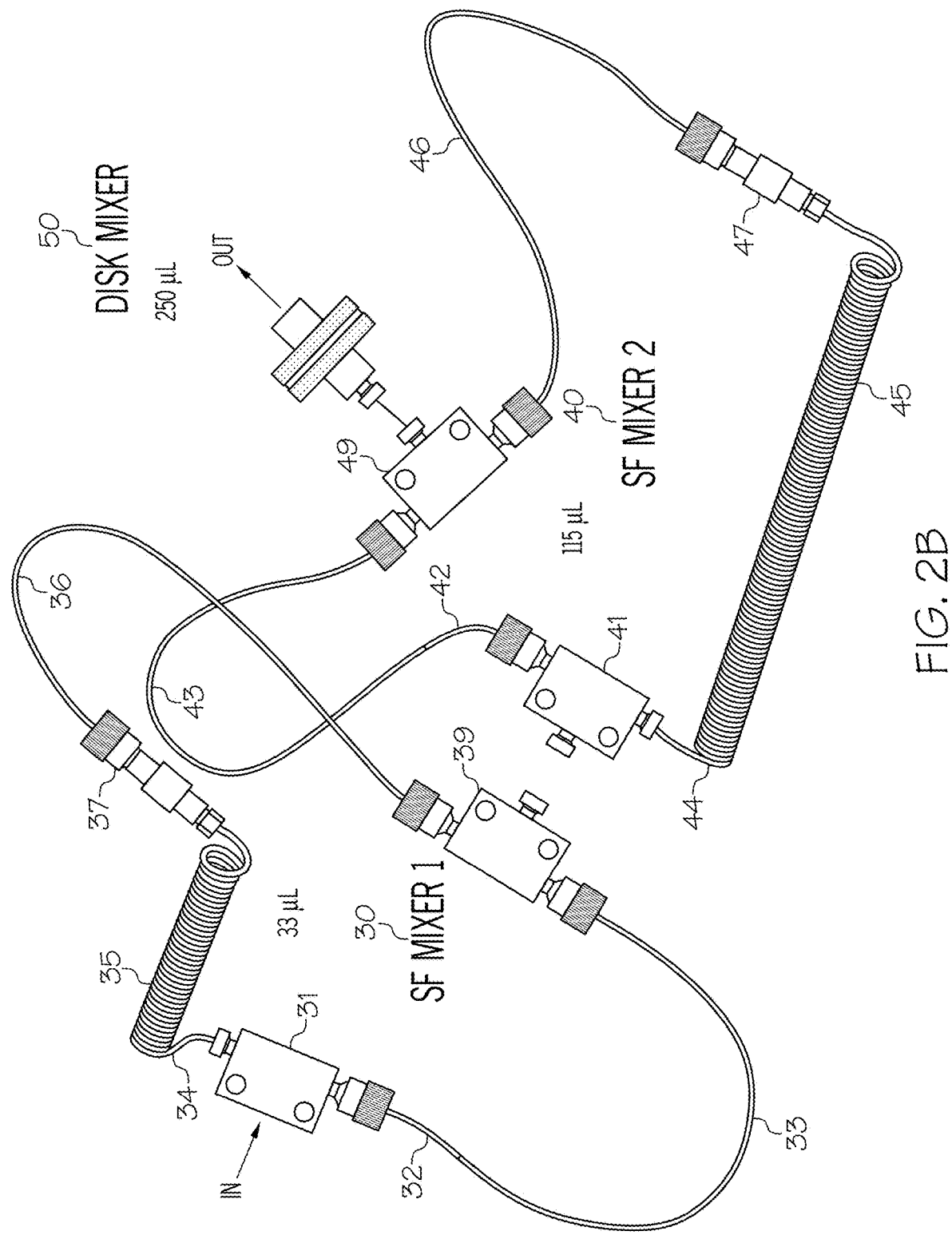
FIG. 2B depicts a photograph of the embodiment of the mixer arrangement of FIG. 2A, in accordance with one embodiment.

FIG. 2A depicts a schematic diagram of an embodiment of the mixer arrangement 100 of the liquid chromatography system 10 of FIG. 1, in accordance with one embodiment. FIG. 2B depicts a photograph of the embodiment of the mixer arrangement 100 of FIG. 2A, in accordance with one embodiment. Referring to both FIGS. 2A and 2B, the mixer arrangement 100 includes a first frequency targeting mixer 30 and a second frequency targeting mixer 40 that is coupled in series to the first frequency targeting mixer 30. A residual noise targeting mixer 50 is connected in series to the second frequency targeting mixer 40. When incorporated into the liquid chromatography system 10, the first frequency targeting mixer 30 is located at the upstream end closest to the pump 12, while the residual noise targeting mixer 50 is located at the downstream end closest to the injector 14 and/or column 22. However, the invention is not limited to an arrangement whereby the residual noise targeting mixer is located downstream from one or more frequency targeting mixers. In other embodiments, one or more noise targeting mixer may be located upstream from the frequency targeting mixers in the mixer arrangement. However, it has been found that placing the residual noise targeting mixer 50 downstream from the one or more frequency targeting mixers 30, 40 provides for better mixing and less compositional variation than only placing the residual noise targeting mixer 50 upstream relative the one or more frequency targeting mixers 30, 40.

While the embodiment shown in FIGS. 2A and 2B show two frequency targeting mixers and a single noise targeting mixer 50, the invention is not limited in this respect. Embodiments contemplated may include any combination of one or more frequency targeting mixers coupled in series to one or more residual noise targeting mixers. For example, a single frequency targeting mixer may be coupled to a single residual noise targeting mixer. By way of another example, a second residual noise targeting mixer may be coupled in series downstream from the noise targeting mixer 50 in the embodiment shown. While other embodiments are contemplated, the embodiment shown in FIG. 2A has been found to particularly reduce most of the compositional noise generated by fluctuations caused by an upstream pump in liquid chromatography systems.

The first frequency targeting mixer 30 is shown including a first flow channel 32 coupled between an inlet 31 and an outlet 39. The frequency targeting mixer 30 includes a second flow channel 34 that is also coupled between the inlet 31 and the outlet 39. The first frequency targeting mixer 30 may thus be a split flow mixer whereby fluid introduced to the inlet is split into one or more parallel paths. In the embodiment shown, the frequency targeting mixer 30 is a split flow mixer having two parallel paths. Such a two-path split flow mixer has been found to target compositional noise oscillations of a specific frequency related to the volume offset between the two paths.

The first flow channel 32 is shown including a first flow restrictor region 33, while the second flow channel 34 is shown including a volume offset region 35 located upstream from a second flow restrictor region 33. The volume offset region 35 may be configured to delay fluid propagation through the second flow channel 34. The volume offset region 35 may create a volume disparity between the first flow channel 32 and the second flow channel 36 which results in the reduction or elimination of fluidic compositional oscillations of a solvent stream that depart from a desired composition at a first target frequency. In the embodiment shown, the first target frequency may be a high frequency noise that corresponds to a full stroke volume of the pump 12. For example, the pump 12 may include a stroke volume 132 uL. In such an embodiment, the volume offset region 35 may include a total volume of about 33 uL, which corresponds to ¼ of the full stroke volume of the pump 12. This ratio has been determined to be particularly advantageous in creating the destructive interference with the two flow paths 32, 34 to dampen noise occurring that oscillates according to the specific frequency associated with the 132 uL stroke volume of the pump 12.

Specifically, the present invention defines "frequency targeting" as specifically dampening a compositional oscillation occurring at a specific frequency that corresponds to a specific volume of fluid moving through the system. One method of "frequency targeting" includes calculating the volume difference between the two flow paths in a split flow mixer and making that volume difference equate to ¼ of the oscillatory volume that the mixer is looking to dampen. For example, if the oscillations correspond to a roughly 132 uL stroke volume, frequency targeting may include creating a split flow mixer whereby the first path is approximately 33 uL (132 uL divided by 4) larger than the second path. Since the volume offset region may comprise the vast majority of a flow path, this amount of approximately 33 uL would be the approximate volume of the volume offset region to target such an oscillation. Other techniques may be found "frequency targeting" that may include other forms of split flow mixers or other types of mixers. However, whatever the embodiment, a "frequency targeting" mixer, as described herein, is configured to dampen compositional oscillation occurring at a specific frequency that corresponds to a specific volume of fluid moving through the mixer. While the embodiment above corresponds to a specific pump having a full stroke volume of 132 uL, for other pump volumes, other volume offset region volumes are contemplated.

The second frequency targeting mixer 40 may be similar to the first frequency targeting mixer 30. However, the second frequency targeting mixer may include a different volume difference between the two parallel paths. As shown, the second frequency targeting mixer 40 includes a first flow channel 42 coupled between an inlet 41 and an outlet 49. The frequency targeting mixer 40 includes a second flow channel 44 that is also coupled between the inlet 41 and the outlet 49.

Like the first frequency targeting mixer 30, the first flow channel 42 of the second frequency targeting mixer 40 is shown including a first flow restrictor region 43, while the second flow channel 44 is shown including a volume offset region 45 located upstream from a second flow restrictor region 43. The volume offset region 45 may be configured to delay fluid propagation through the second flow channel 44 with a different volume than the volume offset region 35 of the first frequency targeting mixer 30. The volume offset region 45 may create a volume disparity between the first flow channel 42 and the second flow channel 46 which results in the reduction or elimination of fluidic compositional oscillations of a solvent stream that depart from a desired composition at a second target frequency that is different than the first target frequency of the first frequency targeting mixer 30.

In the embodiment shown, the second target frequency may be a frequency that corresponds to a low frequency noise of the pump 12. Using the above example of the pump 12 that includes a stroke volume 132 uL, a resulting low frequency noise may also be included in the flow stream after the first stage of frequency targeting. Specifically, such a noise may correspond to an oscillatory frequency that corresponds to a larger volume of approximately 500 uL. In such an embodiment, the volume offset region 45 may include a total volume of about 125 uL, which corresponds to ¼ of this low frequency noise volume of approximately 500 uL.

The residual noise targeting mixer 50 is shown having an inlet port 58, a mixing disk 54, and an outlet port 68. The residual noise targeting mixer 50 may be configured to dampen aperiodic baseline noise in the compositional solvent stream. For example, the residual noise targeting mixer 50 may be configured to smooth residual noise from the high frequency noise related to the full stroke volume of the pump 12 that may remain even downstream from the first frequency targeting mixer 30. Additionally or alternatively, the residual noise targeting mixer 50 may be configured to further dampen the amplitude of the low frequency noise residual that may remain even downstream from the second frequency targeting mixer 40. The frequency targeting mixer may be a disk mixer that includes a mixing disk having an inlet face and an outlet face located between a plurality of flow channels. The mixing disk may include, for example, a dispersive medium having a random porous structure. The total volume of the residual noise targeting mixer 50 may be between 1 and 2 times the noise volume of the baseline noise in the compositional solvent stream prior to the mixing arrangement 100 (i.e. the full stroke volume of the pump). For example, in one embodiment, the residual noise targeting mixer 50 may include a volume of 250 uL, which is less than 2 times the stroke volume of 132 uL.

FIG. 2B depicts a picture of the embodiment of the mixer arrangement 100 of FIG. 2A, in accordance with one embodiment. As shown, the inlets 31, 41 and outlets 39, 49 of the two split flow mixers 30, 40 are tee union connectors or fittings configured to split the flow into two paths at the inlet, and return the flow to one path at the outlet. The flow restrictor capillaries may be, for example, 75-100 µm inner diameter channels of 25 cm in length. The volume offset regions 35, 45 include long tubular columns having the specified volumes described above. Further, included in this figure along the second flow channels 34, 44 of each of the first and second frequency targeting mixers 30, 40 includes respective short columns 37, 47. The short columns 37, 47 may each be 4.6 mm inner diameter columns, and may be 3 cm in length. The short columns 37, 47 may each be packed with inert non-porous particle beads of 10 µm in size.

Figure 3A:
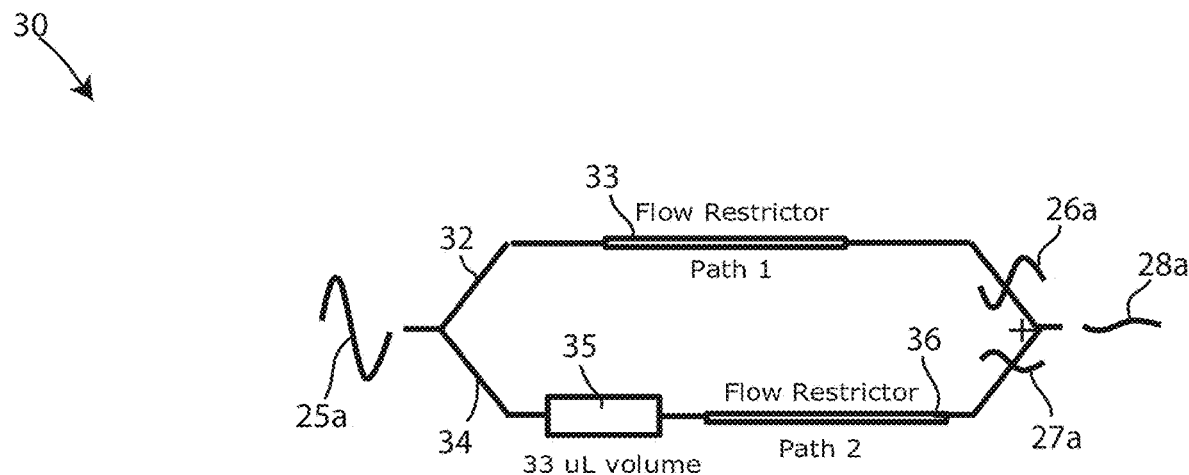
FIG. 3A depicts a schematic diagram of an embodiment of a first frequency targeting mixer of the mixer arrangement of the liquid chromatography system of FIG. 1, in accordance with one embodiment.
Figure 3B:
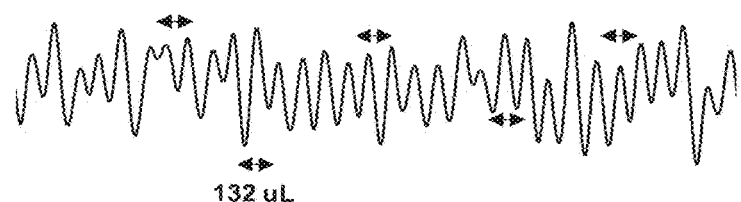
FIG. 3B depicts a graphical representation of compositional noise over time having a first regular frequency, in accordance with one embodiment.
Figure 3C:
FIG. 3C depicts a graphical representation of compositional noise over time after the composition flows through the first frequency targeting mixer, in accordance with one embodiment.

FIG. 3A depicts a schematic diagram of an embodiment of the first frequency targeting mixer 30 of the mixer arrangement of the liquid chromatography system of FIG. 1, in accordance with one embodiment having a mobile phase entering at a first phase and frequency 25a. The mobile phase is shown after the flow restrictor 33 as having flow of mobile phase with a second phase and frequency 26a, which has the same frequency in a different phase as the phase and frequency 25a. The mobile phase is shown after emerging from the volume offset region 35 and the flow restrictor 36 of the second flow channel 34 with a third phase and frequency 27a. The third phase and frequency 27a includes a phase shift that causes destructive interference when the mobile phase from the second flow channel 34. A mobile phase with reduced compositional and noise emerges having an emerging phase and frequency 28a. The FIG. 3B depicts a graphical representation of compositional noise over time having a first regular frequency at the 132 uL stroke volume of the pump 12, in accordance with one embodiment. While not shown, it should be understood that this graph plots absorptive units over time of the mobile phase after emerging from the pump 12 but prior to entering the first frequency targeting mixer 30 at the first stage of the mixer arrangement 100. FIG. 3C depicts a graphical representation of compositional noise over time after the mobile phase flows through the first frequency targeting mixer 30, again plotted as absorptive units over time, in accordance with one embodiment. As shown, the compositional noise of the graphical representation of FIG. 3C shows far less noise. Further, the noise corresponding to the 132 uL volume level frequency has been eliminated. A 500 uL low frequency volume level noise remains.

Figure 4A:
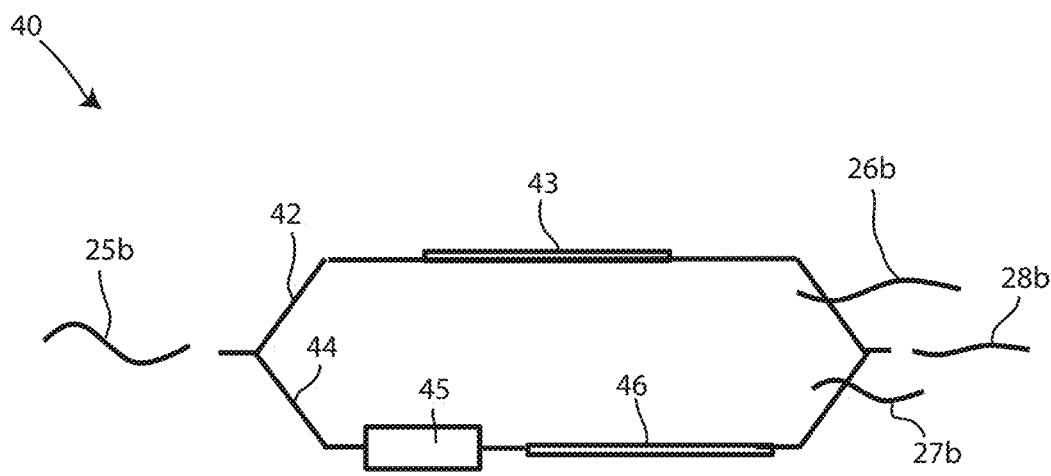
FIG. 4A depicts a schematic diagram of an embodiment of a second frequency targeting mixer of the mixer arrangement of the liquid chromatography system of FIG. 1, in accordance with one embodiment.

FIG. 4A depicts a schematic diagram of an embodiment of the second frequency targeting mixer 40 of the mixer arrangement of the liquid chromatography system of FIG. 1, in accordance with one embodiment having a mobile phase entering at a first phase and frequency 25b. The mobile phase is shown after the flow restrictor 43 as having flow of mobile phase with a second phase and frequency 26b, which has the same frequency in a different phase as the phase and frequency 25b. The mobile phase is shown after emerging from the volume offset region 45 and the flow restrictor 46 of the second flow channel 44 with a third phase and frequency 27b. The third phase and frequency 27b includes a phase shift that causes destructive interference when the mobile phase from the second flow channel 44. A mobile phase with reduced compositional and noise emerges having an emerging phase and frequency 28b. The FIG. 3B depicts a graphical representation of compositional noise over time having a low frequency noise occurring at approximately 500 uL of volume of the mobile phase. While not shown, it should be understood that this graph plots absorptive units over time of the mobile phase after emerging from the first frequency targeting mixer 30 but prior to entering the second frequency targeting mixer 40 at the second stage of the mixer arrangement 100. FIG. 3C depicts a graphical representation of compositional noise over time after the mobile phase flows through the second frequency targeting mixer 40, again plotted as absorptive units over time, in accordance with one embodiment. As shown, the second frequency targeting mixer 40 reduces the compositional noise significantly so that only an aperiodic residual noise.

Figure 5A:
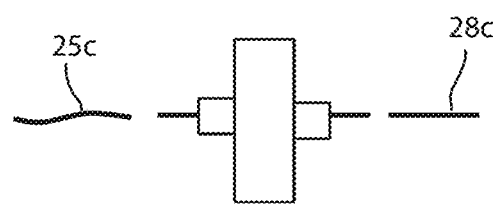
FIG. 5A depicts a schematic diagram of an embodiment of a residual noise targeting mixer of the mixer arrangement of the liquid chromatography system of FIG. 1, in accordance with one embodiment.
Figure 5B:
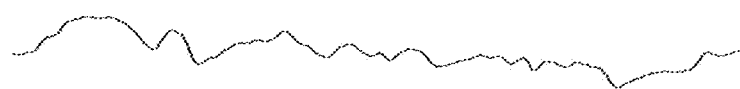
FIG. 5B depicts the graphical representation of compositional noise over time after the composition flows through the first and second frequency targeting mixers but prior to the residual noise targeting mixer, in accordance with one embodiment.
Figure 5C:
FIG. 5C depicts a graphical representation of compositional noise over time after the composition flows through the residual noise targeting mixer, in accordance with one embodiment.

FIG. 5A depicts a schematic diagram of an embodiment of the residual noise targeting mixer 50 of the mixer arrangement of the liquid chromatography system of FIG. 1, in accordance with one embodiment. As shown the residual noise targeting mixer 50 receives the mobile phase from the first and second frequency targeting mixers 30, 40 whereby the mobile phase includes aperiodic noise 25c. The aperiodic noise is minimized with the emerging flow of mobile phase 28c. FIG. 5B depicts the graphical representation of compositional noise over time after the composition flows through the first and second frequency targeting mixers 30, 40 but prior to the residual noise targeting mixer 50, in accordance with one embodiment. FIG. 5C depicts a graphical representation of compositional noise over time after the composition flows through the residual noise targeting mixer 50, in accordance with one embodiment. As shown, the residual noise targeting mixer 50 is configured to significantly dampen, reduce and/or eliminate the aperiodic noise that remains after the two frequency targeting stages in the mixer arrangement 100.

Figure 6:
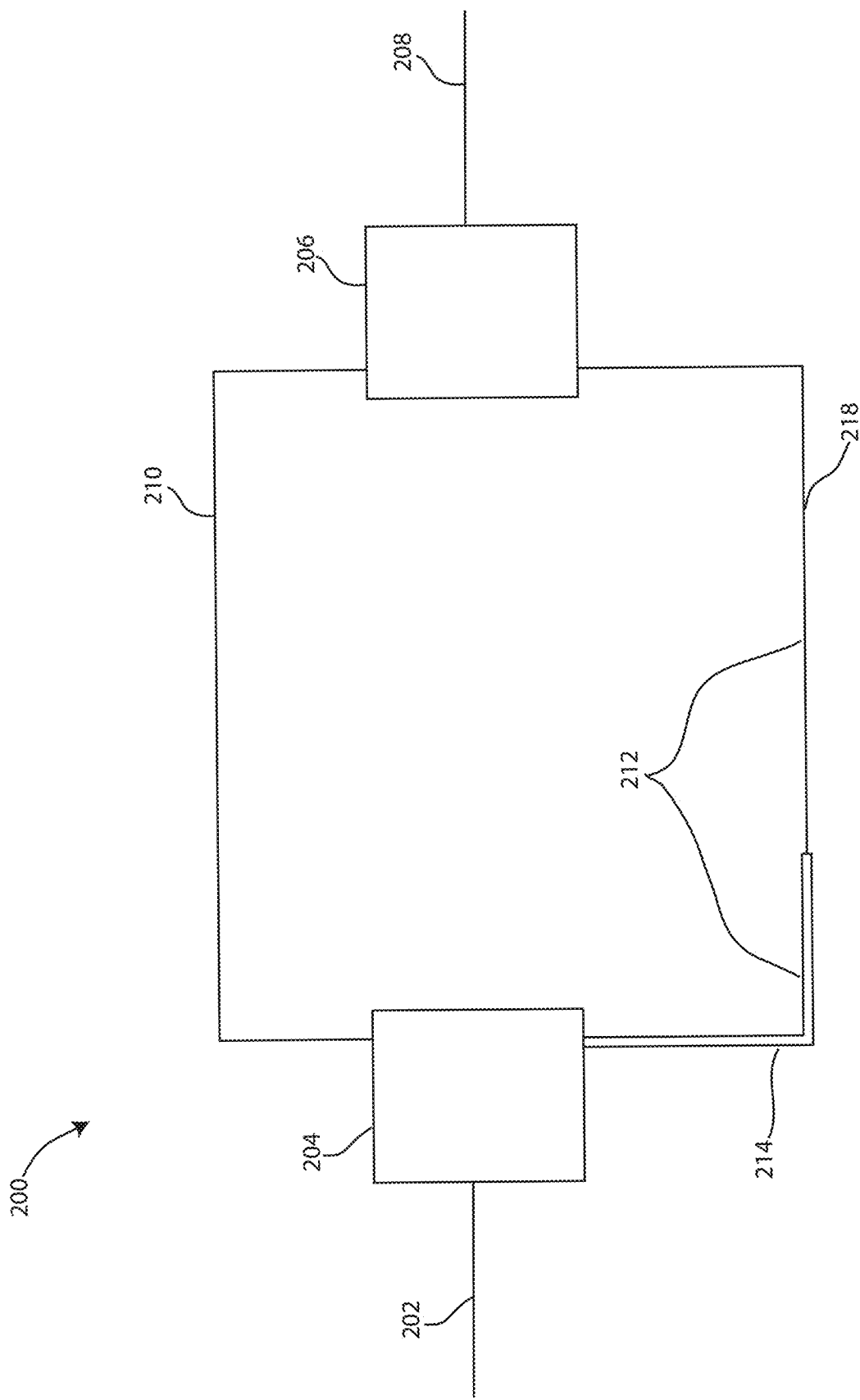
FIG. 6 depicts a schematic diagram of a frequency targeting mixer, in accordance with one embodiment.

FIG. 6 depicts a schematic diagram of a frequency targeting mixer 200, in accordance with one embodiment. The frequency targeting mixer 200 may be representative of either the first frequency targeting mixer 30 or the second frequency targeting mixer 40 described herein above. The frequency targeting mixer 200 is shown as a split flow mixer that that splits the flow of fluid in order to provide for mixing. Embodiments described herein of the frequency targeting mixer 200 include one or more of the following desirable traits of a liquid chromatography mixer: ability to operate passively; ease of manufacture, consistent performance, and efficient mixing of a continuous flow stream with respect to pressure drop and delay volume. The frequency targeting mixer 200 described herein is configured to mix longitudinally, i.e. along the flow direction, and may provide for a smaller decay volume than an equivalent packed-bed mixer.

Moreover, the frequency targeting mixer 200 may be configured for any setting where a continuous flow of fluid needs to be mixed. Particular embodiments described herein are geared toward fluid chromatography applications, and more particularly to liquid chromatography systems (i.e. HPLC and/or UPLC). However, embodiments may also be applicable to supercritical fluid systems (SFC). Any system in which fluid mixing is required may be applicable to the mixer embodiments described herein.

The frequency targeting mixer 200 is configured to receive a fluid flow that enters an inlet and is split into two or more fluidic paths. One of those paths may include a volume offset region configured to delay fluid propagation through the second flow channel relative to the first flow channel. Connected in series downstream from such a volume offset region may be a flow restrictor region having a hydraulic resistance substantially representing a hydraulic resistance of the second flow channel. One or more other paths may include only a flow restrictor region. This split flow may produce the desired mixing and noise reduction/cancellation in compositional ripple.

As shown in FIG. 2, a plurality of these split-flow arrangements (i.e. stages) may be combined in series. A plurality of such stages has been found to sufficiently cancel (i.e. significantly reduce) specific frequencies of fluidic oscillation. Depending on the specific design of the volume offset regions and flow restriction regions, each series-connected stage of contemplated multi-stage mixers described herein may be particularly designed to reduce or cancel these unwanted oscillations in composition at a specific frequency. In combination, a plurality of these series-connected stages may be configured to significantly cancel most or all of the unwanted compositional ripple or oscillation in the composition of fluid coming from the pump.

Referring still to FIG. 6, the frequency targeting mixer 200 may be a passive mixer, in that it does not require any power or controlling. Putting the frequency targeting mixer 100 in line within a chromatography system such as the chromatography system 10 allows the frequency targeting mixer 100 to function as intended to mix a continuous flow stream entering the frequency targeting mixer 100 efficiently with respect to both pressure drop and delay volume.

As shown, the frequency targeting mixer 200 includes an inlet tube 202, which may be located downstream from a pump system, such as the pump 12. The inlet tube 202 may or may not be considered a component of the frequency targeting mixer 200 and may alternatively or additionally be considered a component of the liquid chromatography system 10. The inlet tube 202 is connected to an inlet 204 configured to receive an inlet flow of fluid from the inlet tube 202. The inlet 204 is configured to split the flow through the inlet tube 202 into multiple paths and then recombine the flow upstream at an outlet 206. Each path includes either one section, such as a flow restrictor region, or two sections, such as an upstream volume offset region and a downstream flow restrictor region.

As shown, the inlet 204 is configured to distribute the inlet flow of fluid to each of a first flow channel 210 and a second flow channel 212. The first and second flow channels 210, 212 may be considered channels connected in parallel between the inlet 204 and an outlet 206. The outlet 206 is configured to provide outlet flow of fluid to an outlet tube 208. Like the inlet tube 202, the outlet tube 208 may or may not be considered a component of the frequency targeting mixer 200 and may alternatively or additionally be considered a component of a liquid chromatography system 10.

The first flow channel 210 may comprise a flow restrictor region having a hydraulic resistance substantially representing a hydraulic resistance of the first flow channel 210. In one embodiment, the first flow channel 210 only includes a flow restrictor component extending between the inlet 204 and the outlet 206. The flow restrictor region of the first flow channel 210 may include a relatively small volume and a relatively high hydraulic resistance compared to a volume offset region 214 of the second flow channel 212. In addition to a low volume flow restrictor tube, the flow restrictor first channel 210 and the flow restrictor region 218 of the second channel 212 may include or alternatively be a check valve, a spring loaded check valve, a back pressure regulator, a spring loaded back pressure regulator, a venturi type capillary, or any other fluidic mechanism for giving a fixed pressure drop across the flow path.

The second flow channel 212 may comprise a volume offset region 214 located upstream and connected in series to a flow restrictor region 218. The volume offset region 214 makes up or otherwise contributes a majority of the volume of the second flow channel 212 path. The volume offset region 214 is configured to contribute relatively little hydraulic resistance to the second flow channel 212. In contrast, the flow restrictor region 218 contributes a majority of the hydraulic resistance to the second flow channel 212 but has a relatively small volume compared to the volume offset region 214.

The high volume of the volume offset region 214 may be configured to delay fluid propagation through the second flow channel 212 relative to the first flow channel 210. The high hydraulic resistance section of each of the first and second flow channels 212 is configured to control the flow rate through the paths. By controlling the flow rate and the delay volume on each of the paths (i.e. the first and second flow channels 210, 212), the incoming flow to the inlet 204 through the inlet tube 202 can be split and recombined with a volumetric offset that cancels out oscillations in composition at a specific oscillation frequency or frequencies.

Rather than being a simple greater-volume tube, the volume offset region 214 may alternatively be a diffusion bonded block having an internal chamber, or the like. Further, the volume offset region 214 may apply principles of a split mixer, a chamber mixer, a bead mixer, or a cross flow mixer (i.e. a mixer in which half the flow goes perpendicular left, and the other half goes through a three-quarter turn through a circular passage). The volume offset region 214 may take any form that contributes a delay in fluid propagation through the channel relative another channel.

In the embodiment shown, the hydraulic resistance of the flow restrictor first path 210 may be the same as the hydraulic resistance of the flow resistor region 218 of the second flow channel 212. In other words, the first and second flow channels 210, 212 may each include substantially the same flow restriction (i.e. restriction balance) in order to ensure that the flow is split evenly at the inlet 204. In such an embodiment, the flow configured to split the flow equally between each of the first and second flow channels 210, 212 at the inlet 204. The invention is not limited in this respect, and one or more of the principles described herein may be applicable to split flow mixers where the flow distribution across the various channels is unequally split via varying the flow restriction across each of a plurality of channels in a purposefully uneven or unequal manner to change the flow through each channel in any desired manner. Thus, the restrictions through the flow channels may be un-equal in order to distribute flow unevenly.

In some embodiments, both paths may include a volume offset region located upstream and connected in series to a flow restrictor region. While the embodiment shown includes two paths, other embodiments may include three or more paths where some or all of the paths include a volume offset region located upstream and connected in series to a flow restrictor region. In embodiments having three or more paths, the volume offset regions may each be configured to cancel out oscillations from a desired composition at a different specific oscillation frequency.

In one embodiment, the volume offset region 214 is a 33 uL (microliter) volume offset and may be configured specifically to cancel oscillations in composition occurring at a frequency of about 132 uL (i.e. four times the volume of the volume offset region 214). Any amount of volume offset is contemplated, however. In the case of using a volume offset tube as shown, the volume offset can be increased by lengthening the length of tube used, or by using a larger inner diameter tube. Other examples of appropriate volume offset volumes may be 215 uL, 125 uL, 150 uL, 225 uL. In the embodiment shown in FIG. 2, the volume offset region of the first frequency targeting mixer 30 may be 33 uL and the volume offset region of the second frequency targeting mixer 40 may be 115 uL. The amount of volume offset may be determined by the oscillation frequency relative to a desired composition that is naturally output by a pump system (e.g. a BSM or QSM system) used upstream from the mixer 200. The volume offset region 214 may be connected to the flow restrictor region 218 in series via a two-way fitting or fluidic connector.

Both the first and second flow channels 210, 212 may be connected to the outlet 206, which may be a block having two inlet fittings and an outlet. Thus, the first and second flow channels 210, 212 may be connected in parallel to each other between the inlet 204 and the outlet 206. An inlet block having more than two outlet fittings, and an outlet block having more than two inlet fittings is contemplated in the case that more flow channels are desired in the mixer.

Figure 7:
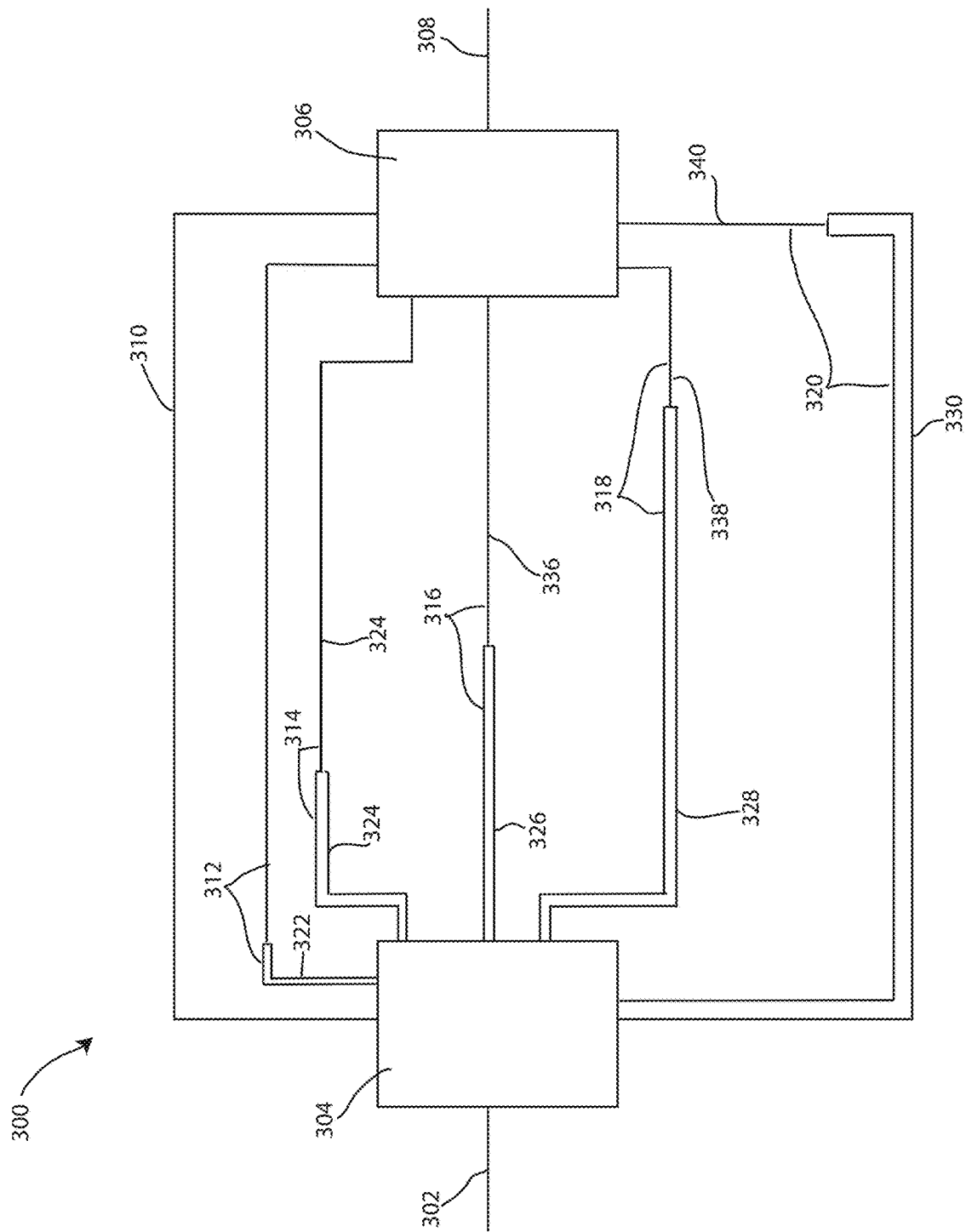
FIG. 7 depicts a schematic diagram of another frequency targeting mixer, in accordance with one embodiment.

FIG. 7 depicts a schematic diagram of an embodiment of another mixer 300 for use in a liquid chromatography system such as the liquid chromatography system 10, in accordance with one embodiment. Rather than splitting the flow evenly between two paths, the mixer 300 is configured with six separate flow channels 310, 312, 314, 316, 318, 320. The top flow channel 310 includes only a flow restrictor region without any volume offset region. However, each of the other flow channels 312, 314, 316, 318, 320 includes its own respective volume offset region 322, 324, 326, 328, 330. The different volume offset regions 322, 324, 326, 328, 330 are shown having different volume offsets. In particular, the volume offset region 322 of the flow channel 312 includes the smallest volume offset. The volume offset region 324 of the flow channel 314 includes the second smallest volume offset. The volume offset region 326 of the flow channel 316 includes the third smallest volume offset. The volume offset region 328 of the flow channel 318 includes the second largest volume offset. The volume offset region 330 of the flow channel 320 includes the largest volume offset. Staggering the volume offsets in this manner may result in a single stage mixer configured to mix a composition in a manner that cancels unwanted compositional ripples. While the mixer 300 is shown with a flow channel having only a restrictor and no volume offset region, other embodiments contemplated include each flow channel having an upstream volume offset region followed by a downstream flow restrictor region. Further, while the mixer 300 displays that mixers having several parallel channels are contemplated, more or less channels than the embodiment shown may be desirable for various applications and are also contemplated. Moreover, the mixer 300 may include even flow restriction through each of the various flow channels 310, 312, 314, 316, 318, 320 so that the flow remains evenly or equally distributed between the channels. In other embodiments, the mixer 300 may include different flow restrictions (i.e. unequal flow restrictions) through each of the various channels 310, 312, 314, 316, 318, 320 in order to distribute flow in an uneven manner.

Figure 8:
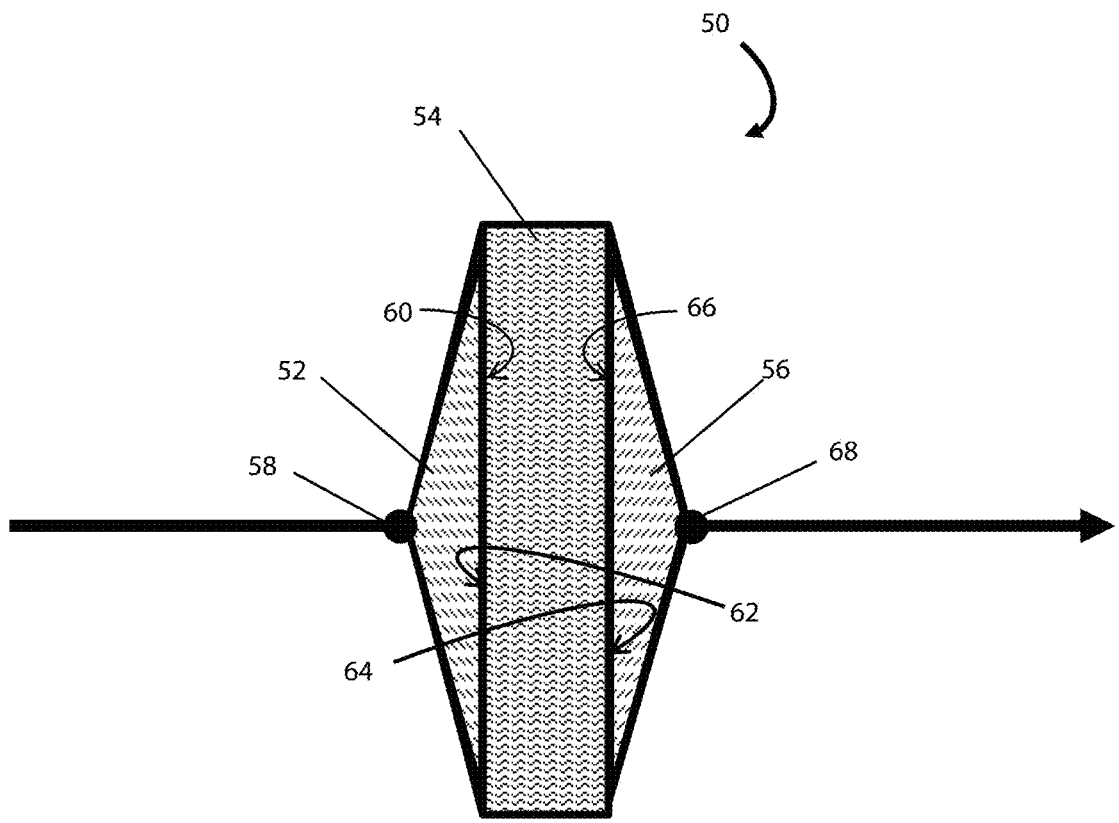
FIG. 8 depicts a schematic diagram of a residual noise targeting mixer of the mixer arrangement of the liquid chromatography system of FIG. 1, in accordance with one embodiment.

FIG. 8 depicts a schematic diagram of a residual noise targeting mixer 50 of the mixer arrangement 100 of the liquid chromatography system 10 of FIG. 1, in accordance with one embodiment. In brief overview, the residual noise targeting mixer may include a disk-shaped mixing element. The residual noise targeting mixer improves the accuracy and precision of a time-programmed composition of a mobile phase delivered by reciprocating pumps in a liquid chromatography system. The residual noise targeting mixer includes a flow distributor, a mixing disk and a flow collector. The mixing disk has an inlet face, an outlet face and a plurality of channels each having an inlet end at the inlet face and an outlet end at the outlet face. The channels have a flow direction anisotropy between the inlet and outlet faces. A compositional solvent stream is distributed across an inlet face of the mixing disk by the flow distributor and is collected after exiting at the outlet face after passing through the mixing disk such that the output of the mixer is a mixed compositional solvent stream.

The residual noise targeting mixer 50 includes a flow distributor 52, a mixing disk 54 and a flow collector 56. The flow distributor has a distributor inlet port 58 and a distributor outlet port 60 having an outlet cross-section. The flow distributor 52 distributes the composition solvent stream received at the distributor inlet port 58 substantially evenly across the outlet cross-section at the distributor outlet port 60.

The mixing disk 54 has an inlet face 62, an outlet face 64 and channels that have inlet ends at the inlet face 62 and outlet ends at the outlet face 64. In some embodiments, the mixing disk 54 is a circular disk; however, alternative embodiments may include disks having other shapes such as a rectangular edge or other non-circular outer edge. The inlet face 62 is in communication with the distributor outlet port 60. The channels have a flow direction anisotropy between the inlet face 62 and outlet face 64. For example, the flow path length defined between the inlet and outlet ends of each channel may generally be different and vary across a range of flow path lengths as described in more detail below. Each channel generally does not have a direct path between the inlet face 62 and outlet face 64 but instead is defined by changes in direction such that channel direction varies along its length. For example, each path may have one or more upward, downward and/or sideways excursions (i.e., radial excursions) such that the path is substantially nonlinear. In some embodiments, channels may allow the liquid to flow backwards along portions of a flow path although in such embodiments the pressure resistance may be significant. The channel direction at a portion along its length includes a longitudinal component (defined along a "thickness axis" that is perpendicular to the disk faces) and a radial component (defined in a plane orthogonal to the thickness axis). Thus, the width of an individual solvent component of a solvent packet is broadened in its passage through the mixing disk 54 as the packet is distributed into different channels having different flow path lengths through the disk material and the stacked packets of solvents generated by the gradient proportional valve can be mixed effectively in the mixing disk volume. The solvent component is thereby mixed with adjacent solvent components that are also broadened by passage through the mixing disk 54. The mixing disk 54 can be fabricated using a three-dimensional (3D) manufacturing process (e.g., by stereolithography) to achieve mixer-to-mixer reproducibility of the mixer properties.

The flow collector 56 has a collector inlet port 66 and a collector outlet port 68. The collector inlet port 66 has an inlet cross-section and is in communication with the outlet face 64 of the mixing disk 54 to thereby receive the flow of the compositional solvent stream after passing through the mixing disk 54. The flow collector 56 substantially evenly collects and combines the flows from the ends of the channels at the outlet face 64 of the mixing disk 54 into a single flow at the collector output port 68.

In some embodiments, the area of the outlet cross section of the flow distributor 52 is substantially equal to a cross-sectional area of the inlet face 62 of the mixing disk 54. Similarly, an area of the inlet cross-section of the flow collector 56 may be substantially equal to a cross-sectional area of the of the outlet face 66 of the mixing disk 54. The flow distributor 52 may be a radial flow distributor, an angular flow distributor, a combination of radial and angular flow distributors, or a fractal flow distributor. Similarly, the flow collector 56 may be a radial flow collector, an angular flow collector, a combination of a radial and angular flow collector, or a fractal flow collector. These types of flow distributors 52 and flow collectors 56 enable most of the volume of the mixing disk 54 to be used for mixing. Similarly, use of a disk for mixing yields maximum mixing for a given mixer volume.

In the absence of a flow restriction, the limited divergence of the received solvent stream would not spread across the full input face 62 of the mixing disk 54. Moreover, the performance of the mixer 50 is proportional to the square of the mixer volume. Thus, the flow distributor 52 is used to even distribute the compositional solvent stream receive at the inlet port 58 into a large number (e.g., at least ten) of individual flows incident at the inlet face 62 of the mixing disk 54. For example, the solvent flow at the inlet port 58 may be approximately 100 μm to 200 μm in diameter and each individual flow may similarly be approximately 100 μm to approximately 200 μm in diameter. The flow collector 56 similarly evenly collects the individual flows exiting from the outlet face 64 of the mixing disk 54 into a single flow of approximately 100 μm to 200 μm in diameter. This range of diameters can induce significant molecular dispersion in the mixing disk 54 and provide a flow restriction that is greater than the flow restrictions of the flow distributor 52 and flow collector 56.

As used herein, tortuosity means a ratio of a flow path length of a channel between its ends normalized to the straight-line distance between its ends. Thus, tortuosity is a characterization of the convoluted channels for fluid dispersion through the mixing medium. The tortuosity of the mixing disk 54 is given by the average flow path length of the channels relative to the thickness of the mixing disk 54. In some embodiments, the tortuosity of the channels is at least five and, in other embodiments, the tortuosity of the channels does not exceed ten. The mixer 50 may be characterized by a retention time distribution (RTD) which is determined by the different flow path lengths through the mixing disk 54. The objective of the random channel structure through the mixing disk 54 is to enlarge the RTD. The flow anisotropy and multi-channel tortuosity of the mixing disk 54 enables a skewness for the RTD to be reduced to a value close to zero and allows the solvent composition of the solvent mixture at the collector outlet port 68 to more quickly achieve the programmed solvent composition.

In some embodiments, the flow path lengths are randomly defined according to the internal porous structure of the mixing disk 54. The mixing disk 54 may be formed from a dispersive material having a random porous structure. In this instance, the flow path lengths of the channels are substantially uncorrelated to each other.

The void volume of the mixing disk 54 is preferable selected based on the pump stroke volume for the pump system. In some embodiments, the value of the void volume is between about two time the pump stroke volume to about three times the pump stroke volume. For instance, based on three times the pump stroke volume, a 400 μm mixer may be used with a pump system having a 132 μL pump stroke volume.

In some embodiments, the mixing disk 54 is manufactured via a machining process or 3D printing. The mixing disk 54 may include a predefined arrangement of channels having a range of path flow path lengths or include a labyrinth of channels. The disk material preferably is a chemically inert material such as a glass, polymer or metal. In one preferred implementation, the mixing disk 54 is a cleaned passivated stainless steel disordered structure that is inert with respect to the solvents.

The volumes of the flow distributor 52 and flow collector 56 are preferably small compared to the void volume of the mixing disk 54 to thereby limit the total pressure drop across the residual noise targeting mixer 50. In one example, the pressure drop across the residual noise targeting mixer 50 does not exceed 20 MPa (3,000 psi) at a flow rate of 5 mL/min. for water at room temperature.

Figure 4B:
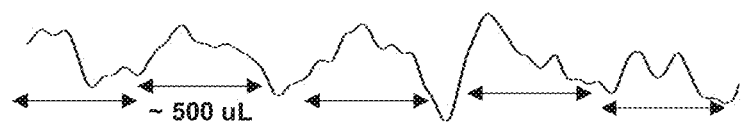
FIG. 4B depicts the graphical representation of compositional noise over time after the composition flows through the first frequency targeting mixer but prior to the second frequency targeting mixer, in accordance with one embodiment.
Figure 4C:
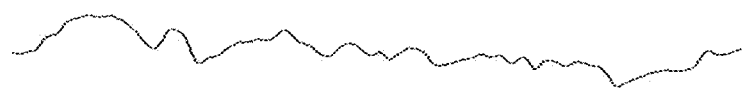
FIG. 4C depicts a graphical representation of compositional noise over time after the composition flows through the second frequency targeting mixer, in accordance with one embodiment.
Figure 9A:
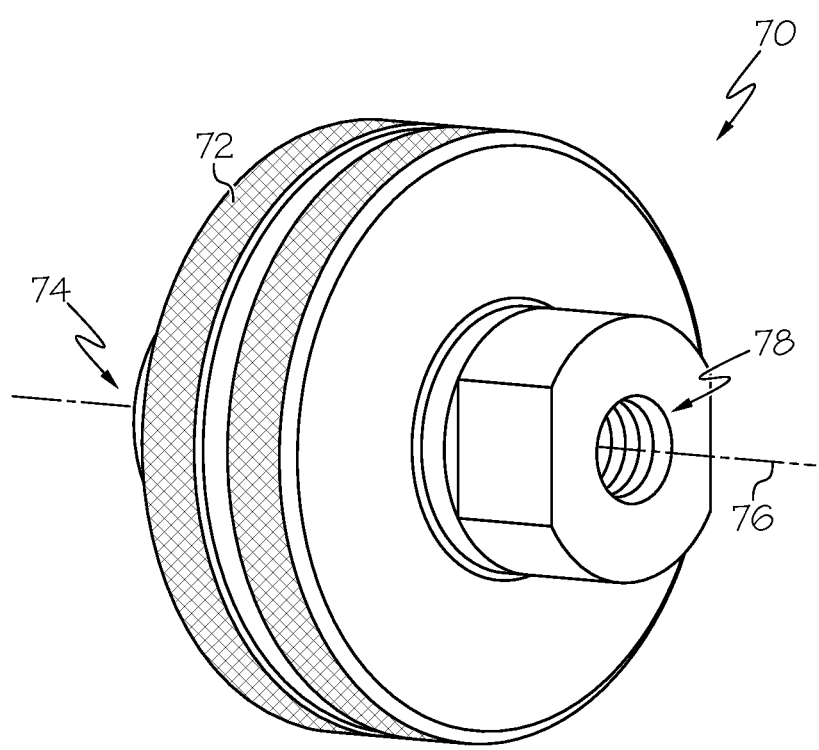
FIG. 9A and FIG. 9B show a perspective view and cutaway schematic view, respectively, of an embodiment of a mixer for a liquid chromatography system.
Figure 9B:
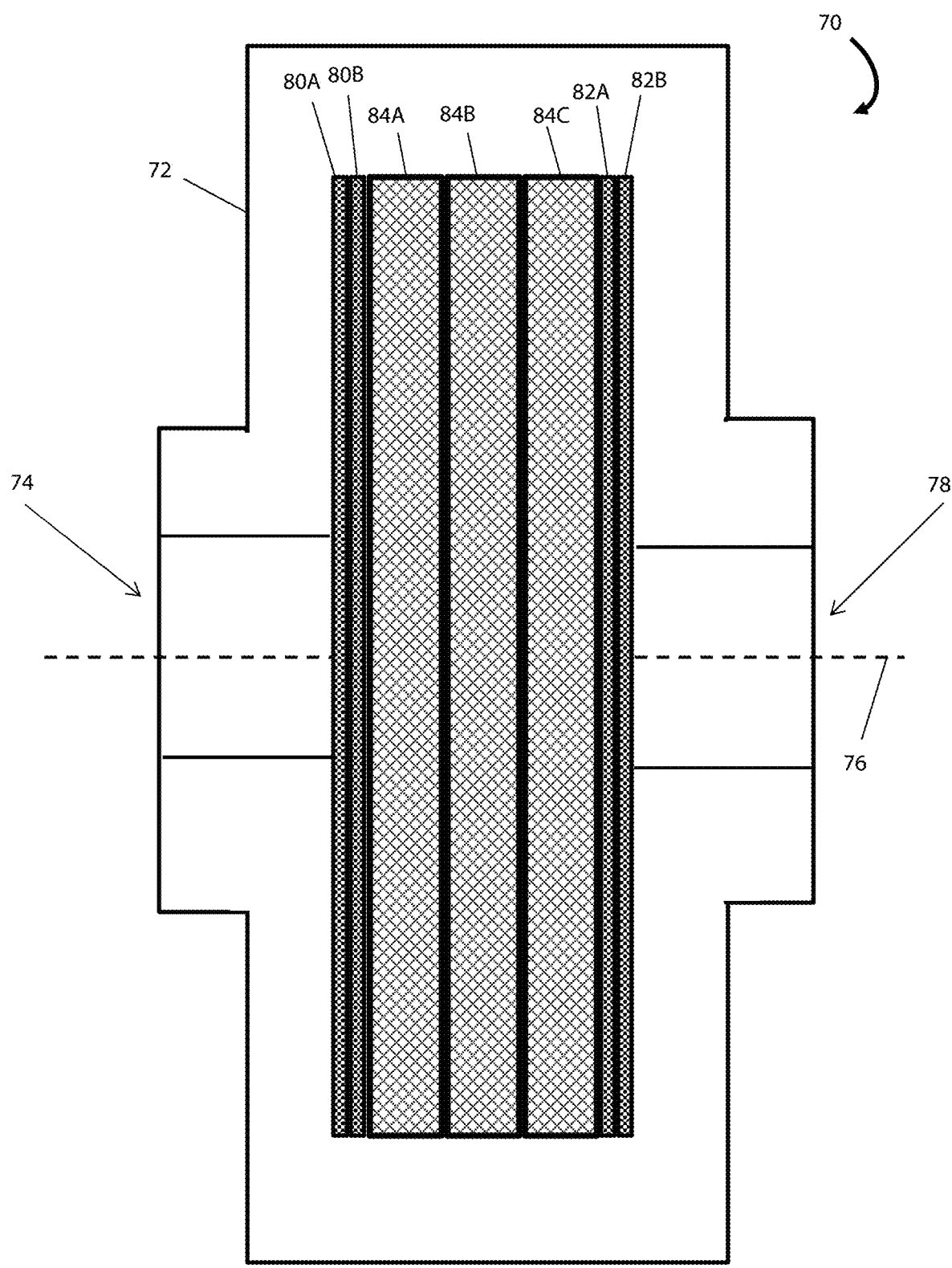

FIG. 9A and FIG. 9B show a perspective view and cutaway schematic view, respectively, of an example of a mixer 70 for a liquid chromatography system. The mixer 70 is formed from stacked layers of metal mesh in which combinations of certain mesh layers substantially correspond to the flow collector 52, mixing disk 54 and flow collector 56 of the mixer 50 of FIG. 4 to enable evaluation of mixing performance.

The mixer 70 includes a housing 72, an inlet 74 to receive a solvent composition flow along flow axis 76, and an outlet 78 to provide a mixed solvent composition flow. The inlet 74 is configured to receive a fitting to couple to a conduit (e.g., stainless steel tubing) that conducts the solvent composition stream. Similarly, the outlet 78 is configured to receive a fitting to couple to a conduit to conduct the mixed solvent composition stream from the mixer 70. Due to the symmetrical construction of the mesh mixer 70, the roles of the inlet 74 and outlet 78 may be reversed.

The mixer 70 includes a first pair of mesh layers 80A and 80B, a second pair of mesh layers 82A and 82B, and a group of three mesh layers 84A, 84B and 84C. In one embodiment, the two pairs of mesh layers 80 and 82 are used as substitutes for the flow distributor and flow collector. Each layer 80 or 82 is a 75 μm thick stainless steel mesh with a 5 μm mesh interstitial spacing. Each pair of layers 80 and 82 acts as a flow restrictor to approximate an ideal flow distribution or ideal flow collection. Each of the three layers 84 in the middle of the layer stack is a 400 μm thick stainless steel mesh with a 40 μm mesh interstitial spacing. The group of layers 84 forms a porous dispersive structure that acts as the mixing disk. It will be noted that in an improved implementation a disordered, or random, material would be used instead of the group of layers 84 with a preferential diffusion in the radial direction thereby increasing the tortuosity and enabling an improvement in the reduction of skewness of the RTD.

Figure 10A:
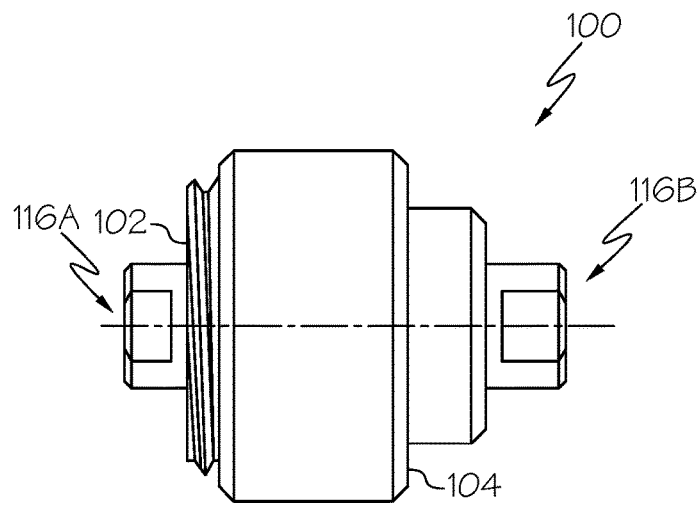
FIGS. 10A, 10B and 10C are a side, end view and cutaway side view, respectively, of an example of a mixer that can be used to mix a compositional solvent stream in a liquid chromatography system.
Figure 10B:
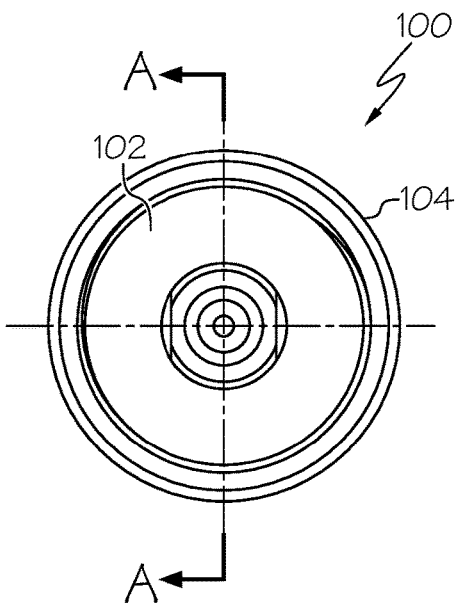
Figure 10C:
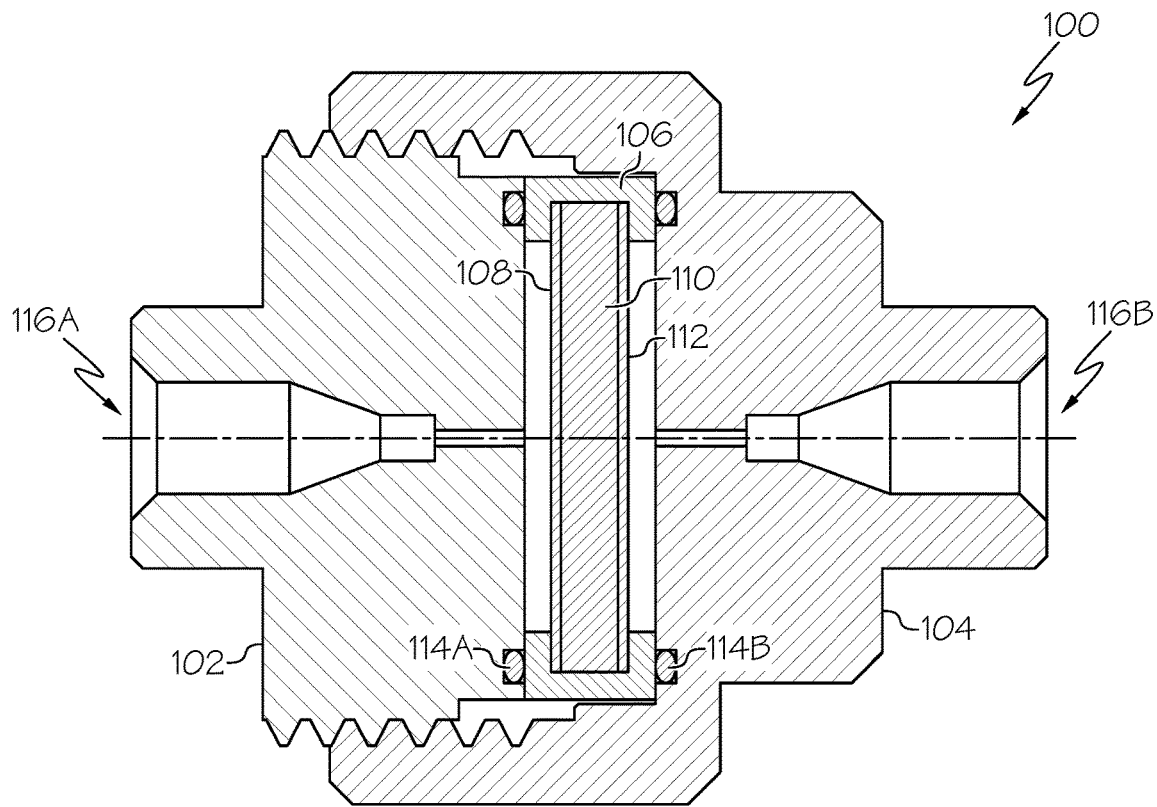

FIGS. 10A, 10B and 10C are a side, end view and cutaway side view, respectively, of an example of a mixer 100 that can be used to mix a compositional solvent stream in a liquid chromatography system. The mixer includes a first housing part 102, a second housing part 104, an annular ring 106, a flow distributor 108, a mixing disk 110 and a flow collector 112. The flow distributor 108, mixing disk 110 and flow collector 112 are held within the annular ring 106. The first housing part 102 includes threads on an outer surface which engage threads on an inner bore surface of the second housing part 104. The first housing part 102 is inserted into the second housing part 104 until both components are in contact with opposite sides of the annular ring 106. A pair of gaskets 114A and 114B create a fluidic seal between the annular ring 106 and the first housing part 102 and the annular ring 106 and the second housing part 104, respectively. Liquid entering the mixer 100 at mixer port 116A exits at mixer port 116B. The mixer 100 may alternatively be used with liquid flowing in the reverse direction, that is, by entering at mixer port 116B and exiting at mixer port 116A.

Figure 11:
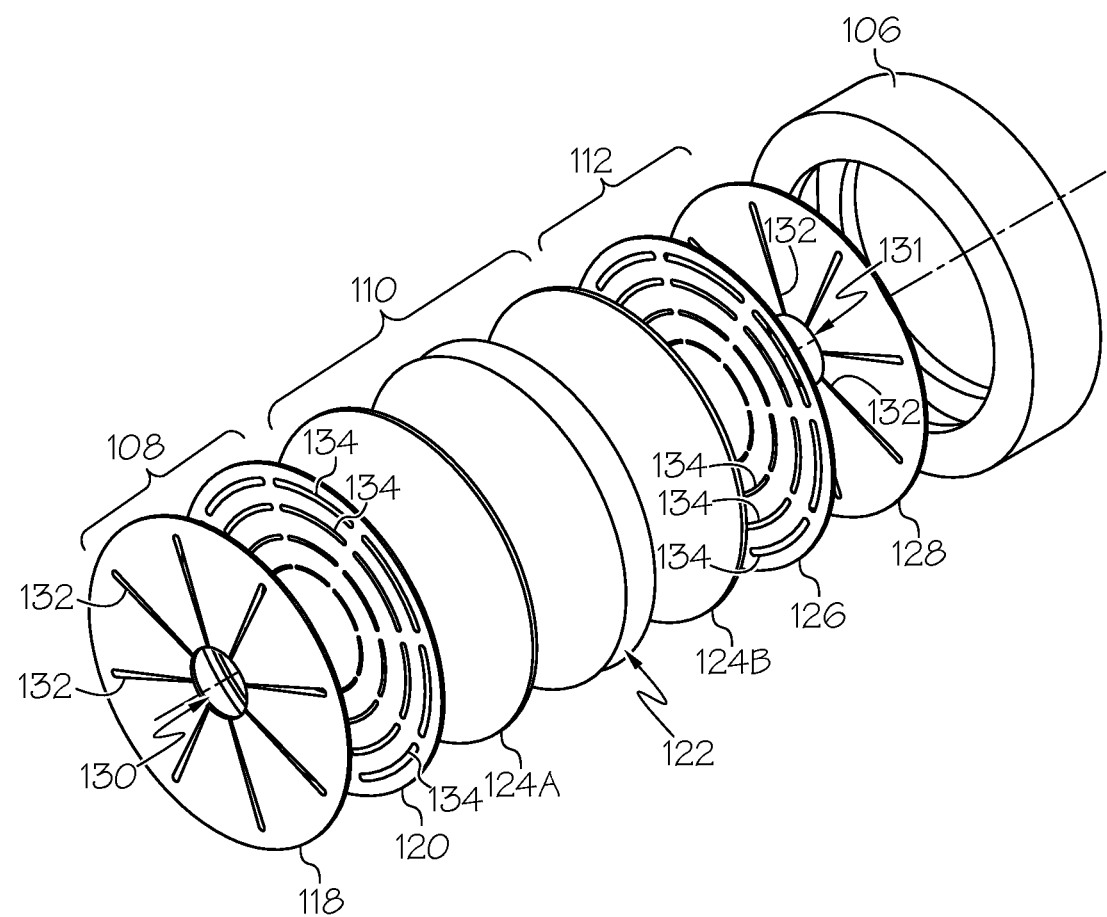
FIG. 11 is an exploded view of the annular ring shown in FIG. 10C showing the components held within the annular ring.

FIG. 11 is an exploded view of the annular ring 106 and the components held within the ring 106. The flow distributor 108 includes an inlet angular dispersion plate 118 and an inlet radial dispersion plate 120. The mixing disk 110 includes a disk 122 having a random porous structure disposed between two fine mesh disks 124A and 124B (e.g., two metal mesh screens each having a 5 µm spacing). The flow collector 112 includes an outlet radial dispersion plate 126 and an outlet angular dispersion plate 128.

The inlet and outlet angular dispersion plates 118 and 128, respectively, include a central opening 130 and 131, respectively, with slots 132 extending radially from the central opening 130 and 131. The slots 132 are wedge-shaped, that is, increasing in width with increasing distance from the center. The inlet and outlet radial dispersion plates 120 and 126, respectively, include an arrangement of concentric arc-shaped slots 134 arranged at one of three different radii from the center of the plate. The widths of the slots are greater for increased distance from the center. The combination of an angular dispersion plate and a radial dispersion plate act to efficiently distribute or collect independent flows into or out from the mixing disk 110. It will be recognized that the materials and dimensions of the plates 118 and 128, as well as the arrangement (including the number and dimensions) of the slots 132 and 134 in a plate may be different in other embodiments.

Figure 12:
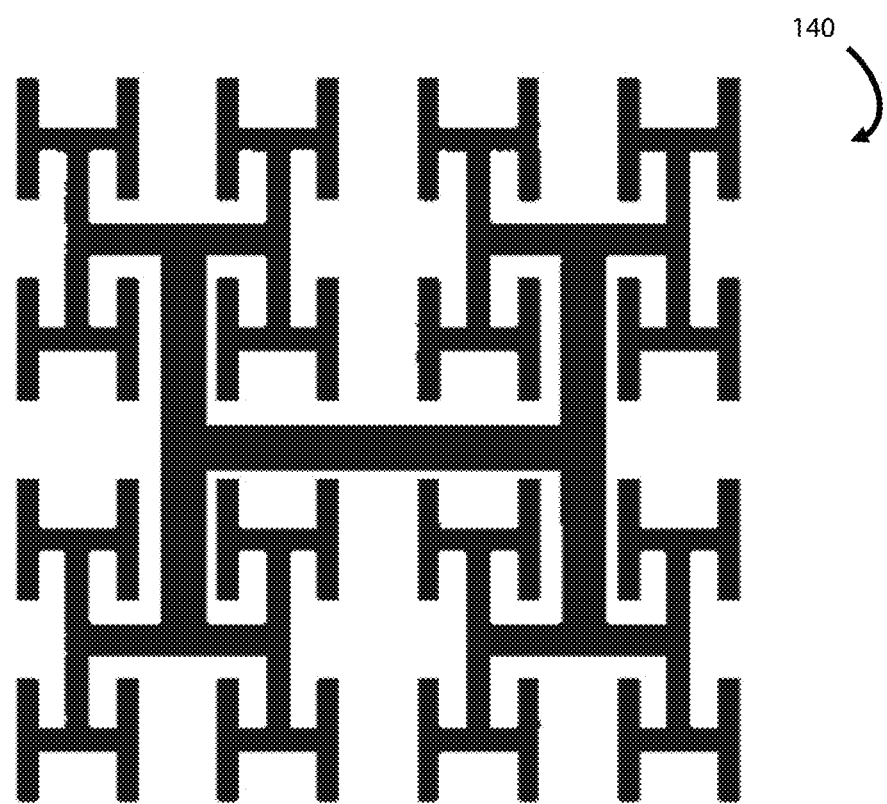
FIG. 12 is an example of a fractal flow distributor.
Figure 13:
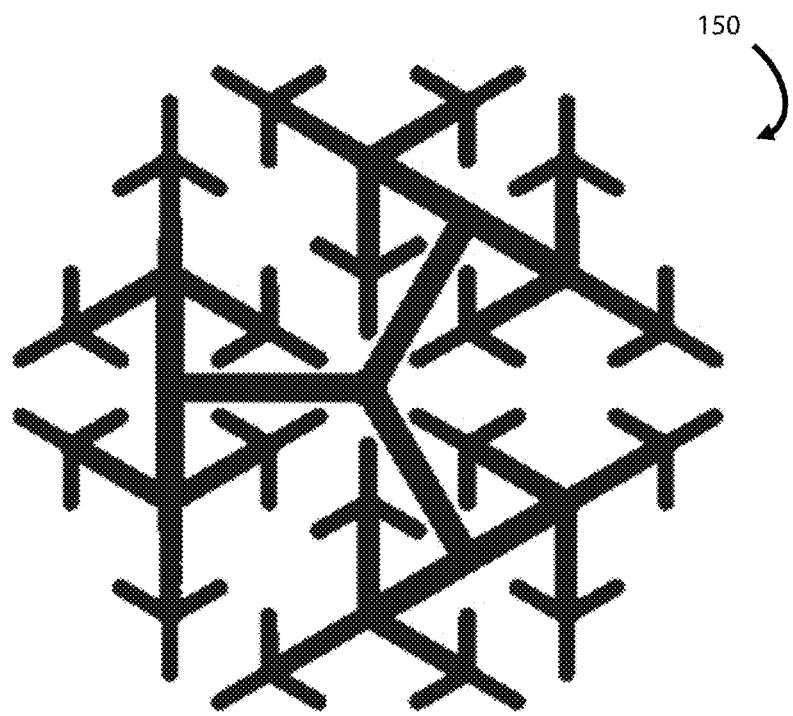
FIG. 13 is another example of a fractal flow distributor.

FIG. 12 is an example of a fractal flow distributor 140 that can be fabricated, for example, using a 3D-printing stereolithography process. The distributor 140 includes a central through hole that is split into two ramification channels each of which is again split into two ramification channels each of which is further split into another two ramification channels and so on. The splitting of channels occurs through the thickness of the distributor plate or disk to generate a fractal distribution of the flow over a surface. FIG. 13 is another example of a fractal flow distributor 150 that can be fabricated using a similar fabrication process. In this example, the distributor 150 includes a structure that splits into three ramification channels each of which is split and leads to three ramification channels each of which leads to another three ramification channels.

Figure 14:
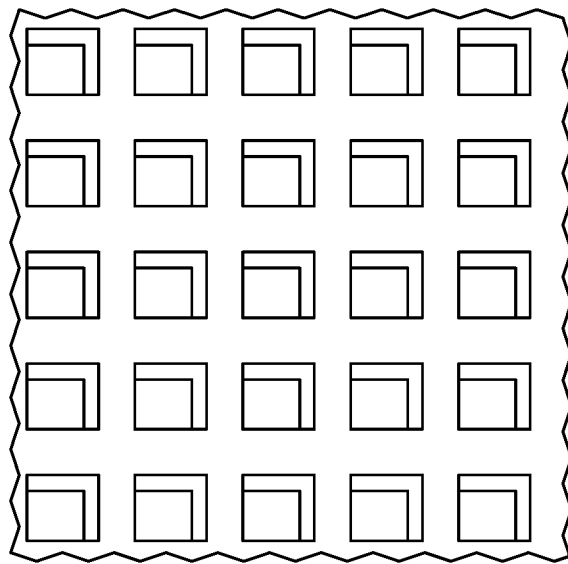
FIG. 14 shows a portion of an embodiment of a mixing disk.
Figure 15A:
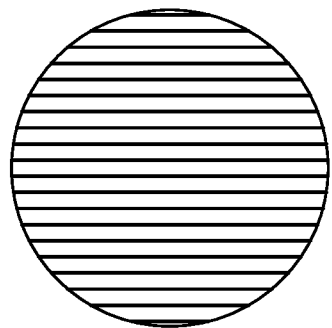
FIGS. 15A to 15D show photomasks that may be used in a three-dimensional fabrication process that includes sequential ultraviolet curing of a polymer material to build a mixing disk.
Figure 15B:
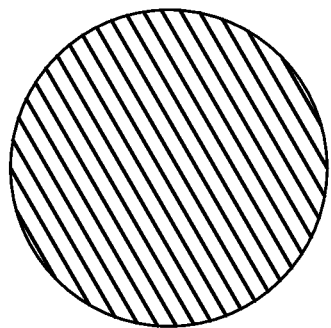
Figure 15C:
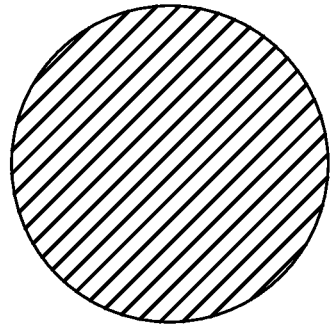
Figure 15D:
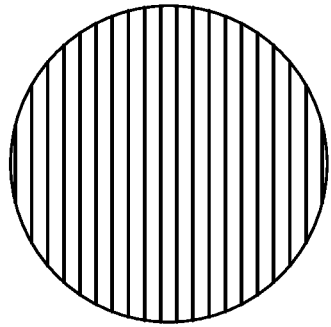

FIG. 14 is an example of a portion of a mixing disk 160 that can be made using a 3D fabrication process, such as stereolithography, with a polymer material. For example, use of the photomasks shown in FIG. 15A and FIG. 15D may be alternately used in a sequential ultraviolet (UV) cure of a polymer material to build square-like features of 50 µm on a side. First, straight channels are formed using the photomask shown in FIG. 15A then a square cross-section channel is formed using the photomask shown in FIG. 15D. The thickness of the resulting slice depends on the intensity of the UV light source, the concentration of a photo-initiator compound in the polymer material, monomer concentration and the UV exposure time. The curing process can be repeated multiple times with removal of unpolymerized material between cure cycles. In this way many layers can be stacked to fabricate various 3D structures by translating and/or rotating (e.g., see photomasks in FIGS. 15B and 15C) each slice relative to the other slices. This process is just one example of a fabrication technique for forming a mixing disk and it will be recognized that other fabrication techniques can also be used.

Figure 16B:
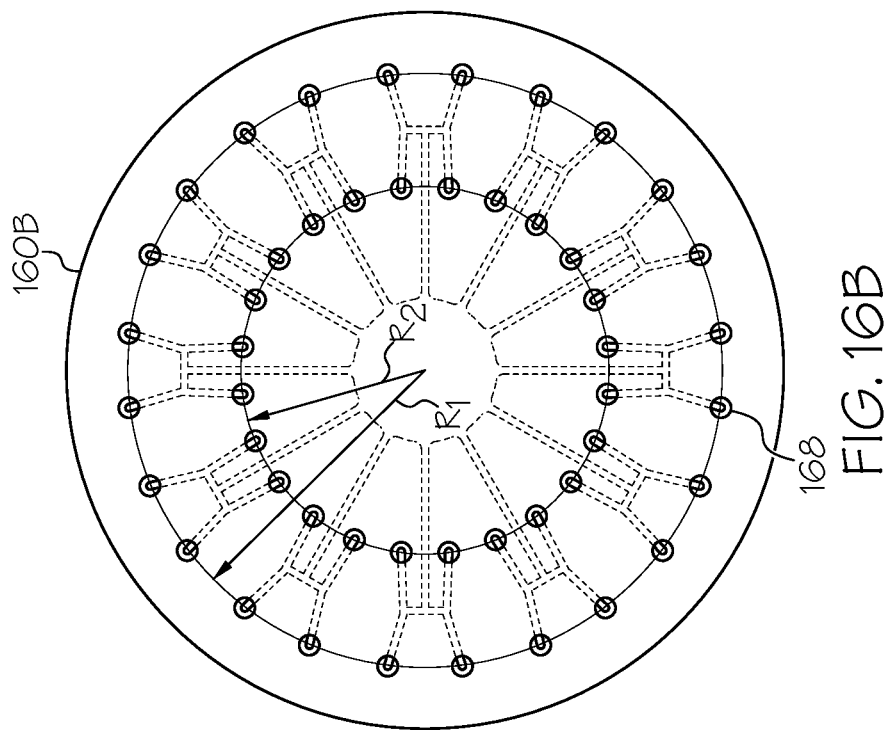
FIGS. 16A and 16B show the downstream surfaces of two plates used to form a flow distributor for an embodiment of a mixer.
Figure 16A:
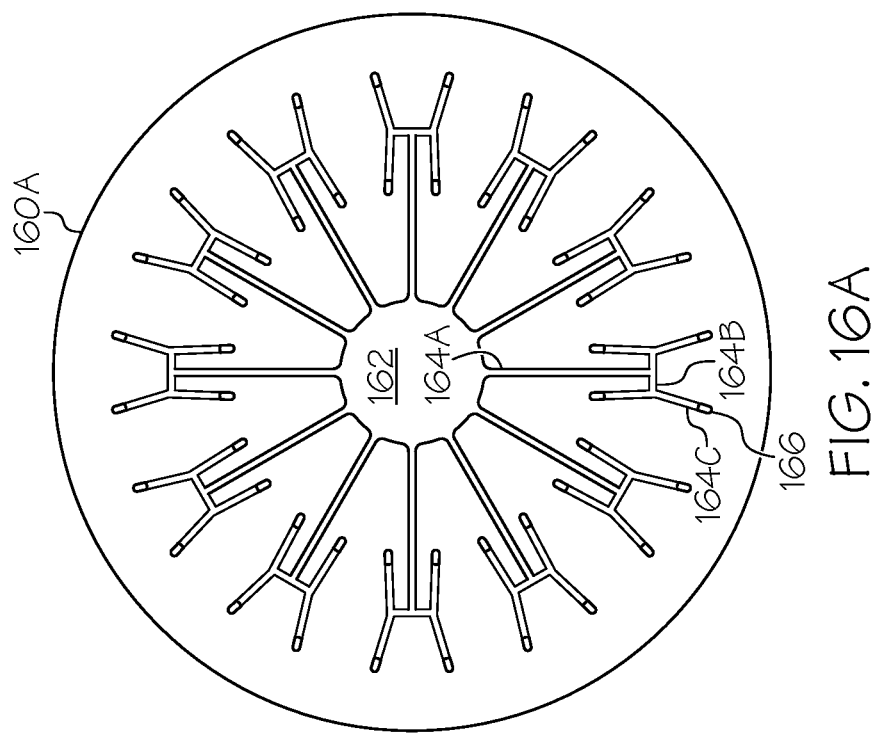

In one embodiment, a flow distributor is made of two plates 160A and 160B as shown in FIGS. 16A and 16B, respectively, in views of their downstream surfaces. The first plate 160A has a fractal distribution path structure. Internally, the first plate 160A includes a series of fluidic paths that start from an open circular central region 162 that receives the flow from the distributor inlet. First flow paths 164A extend at one end radially from the central region 162 to an opposite end at a midpoint of a second flow path 164B that is perpendicular to the first flow paths 164A. Each end of a second flow path 164B is near or at a midpoint of a third flow path 164C. As illustrated, there are 12 first flow paths 164A, 12 second flow paths 164B and 24 third flow paths 164C. At each end of each of the third flow paths 164C is an opening 166 at the downstream surface of the first plate 160A. The plates 160 are secured together such that openings 166 in the first plate 160A are aligned with corresponding openings 168 in the second plate 160B.

The fluidic paths and other features of the flow distributor may be formed in a variety of ways. For example, known micro-machining techniques may be utilized. Alternatively, an etching process may be utilized to form the desired structure.

Each opening 168 is defined along one of two concentric circles of radius $R_1$ or $R_2$ with each circle being concentric with the mixer flow axis. Thus, a flow received at the distributor inlet port is internally separated into 12 flows, each of which is separated into four flows so that the number of flows exiting the second plate 160B is 48. The diameters of the openings 168 are preferably equal. In a non-limiting numerical example, the total area defined by all 48 openings is approximately five percent of the total downstream surface area of the second plate 160B.

Figure 17:
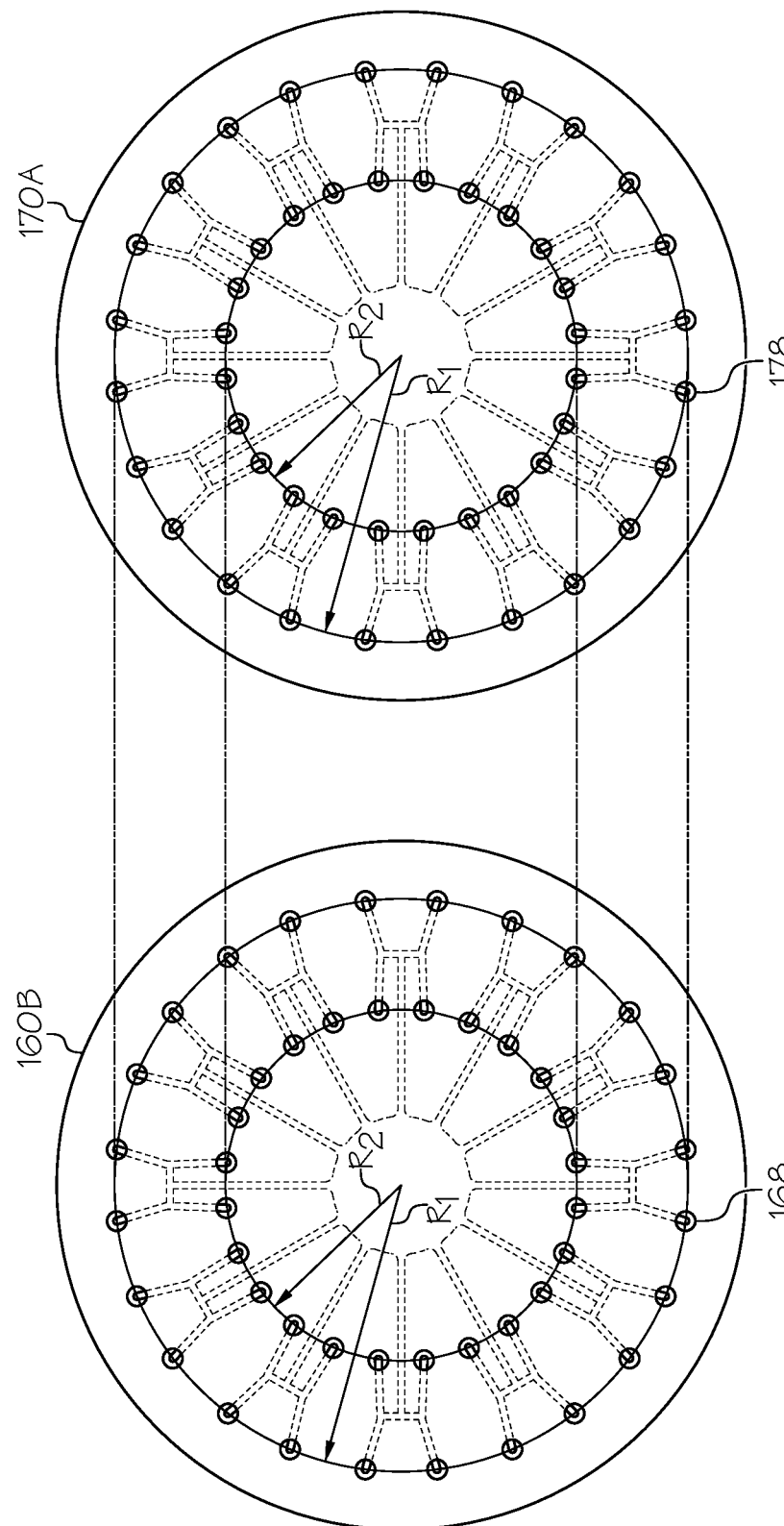
FIG. 17 depicts the relationship between openings in a second plate of a flow distributor with respect to openings in a first plate of a flow collector in one embodiment of a disk mixer.

In one embodiment (Embodiment A), the flow distributor and flow collector are of identical construction, i.e., the mixer exhibits axial mirror symmetry about the mixing disk. In other words, the first plate 160A of the flow distributor is identical to the second plate of the flow collector and the second plate 160B of the flow distributor is identical to the first plate of the flow collector. The mixer is therefore configured such that the features of the flow collector are arranged in an inverse axial flow direction to those of the flow distributor but are otherwise the same. FIG. 17 illustrates the relationship between the openings 168 in the second (downstream) plate 160B of a flow distributor with respect to the openings 178 in a first (upstream) plate 170A of a flow collector in a mixer constructed in this manner. Each opening 168 and 178 is located on one of the two concentric circles of radius $R_1$ and $R_2$. The openings at the distributor outlet port are arranged identically to the openings at the collector inlet port. Thus, there is a one-to-one correspondence between each opening 168 in the second plate 160B of the flow distributor with a respective opening 178 in the first plate 170A of the flow collector. However, in other embodiments, the flow distributor and flow collector do not define a symmetrical arrangement about the mixing disk, as described further below.

Figure 18B:
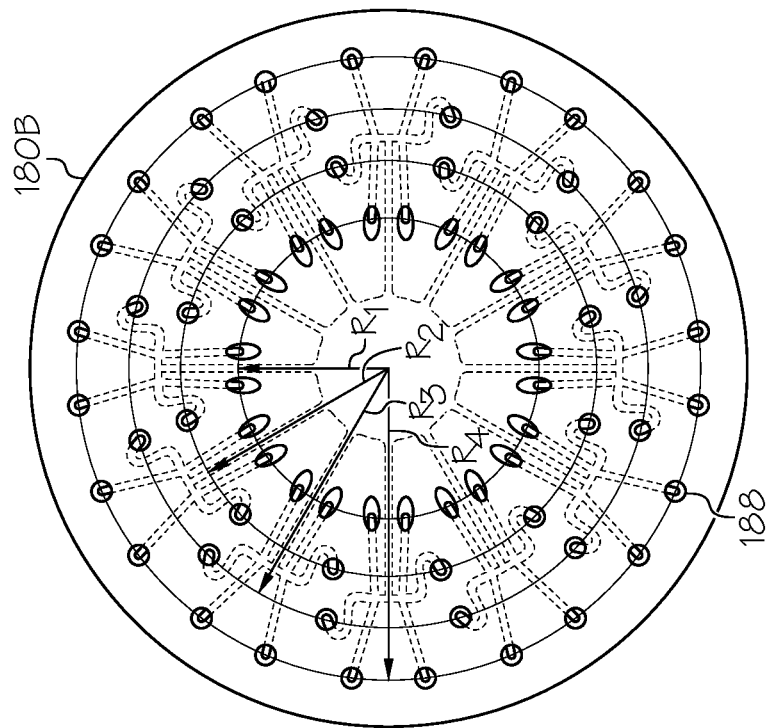
FIGS. 18A and 18B show the downstream surfaces of two plates used to form a flow distributor for another embodiment of a mixer.
Figure 18A:
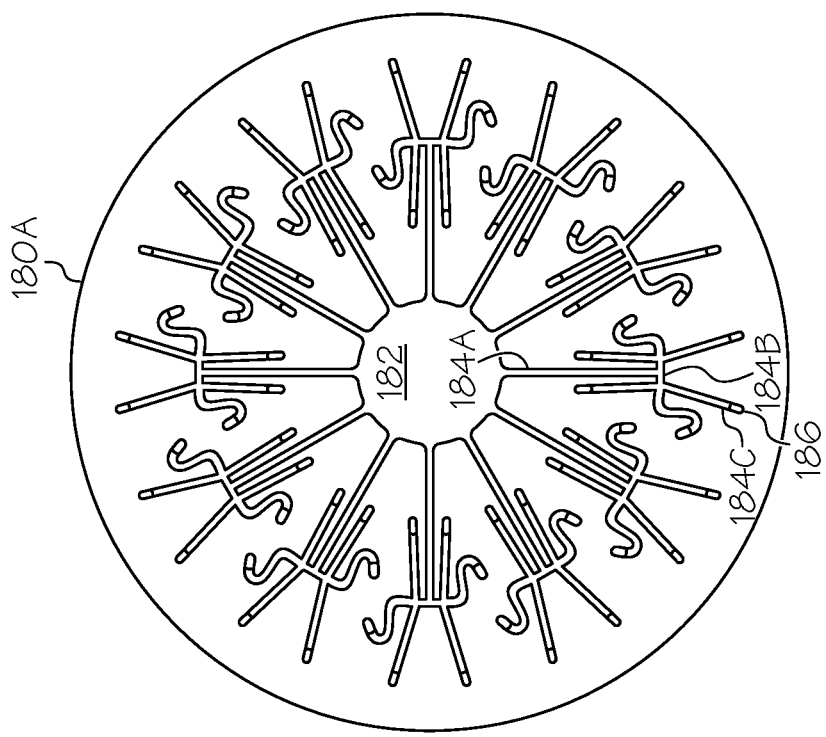

FIGS. 18A and 18B depict the downstream surfaces of two plates 180A and 180B, respectively, used in a different implementation of a flow distributor. Internally, the first plate 180A includes a series of fluidic paths that start from an open circular central region 182 that receives the flow from the distributor inlet. First flow paths 184A extend at one end radially from the central region 182 to an opposite end at a midpoint of a short second flow path 184B arranged perpendicular to the first flow paths 184A. Each end of each second flow path 184B is coupled to one end of each of three third flow paths 184C. As illustrated, there are 12 first flow paths 184A, 12 second flow paths 184B and 36 third flow paths 184C. At each end of each of the third flow paths 184C is an opening 186 at the downstream surface of the plate 180A. The plates 180A and 180B are secured together such that openings 186 in the first plate 180A are aligned with the openings 188 in the second plate 180B.

Each opening 188 is defined along one of four concentric circles of radius $R_1'$, $R_2'$, $R_3'$ and $R_4'$, all of which are concentric with the mixer flow axis. A flow received at the distributor inlet port is separated into 12 flows, each of which is separated into two flows which are each further separated into three flows such that the number of flows exiting the second plate 180B is 72. Thus, the number of individual flows incident on the upstream surface of the mixing disk is greater than that for the embodiment illustrated in FIGS. 16A and 16B.

In one embodiment (Embodiment B) of a mixer, both the flow distributor and flow collector are formed as identical components each having 72 openings and are symmetrically arranged about the mixing disk.

Figure 19:
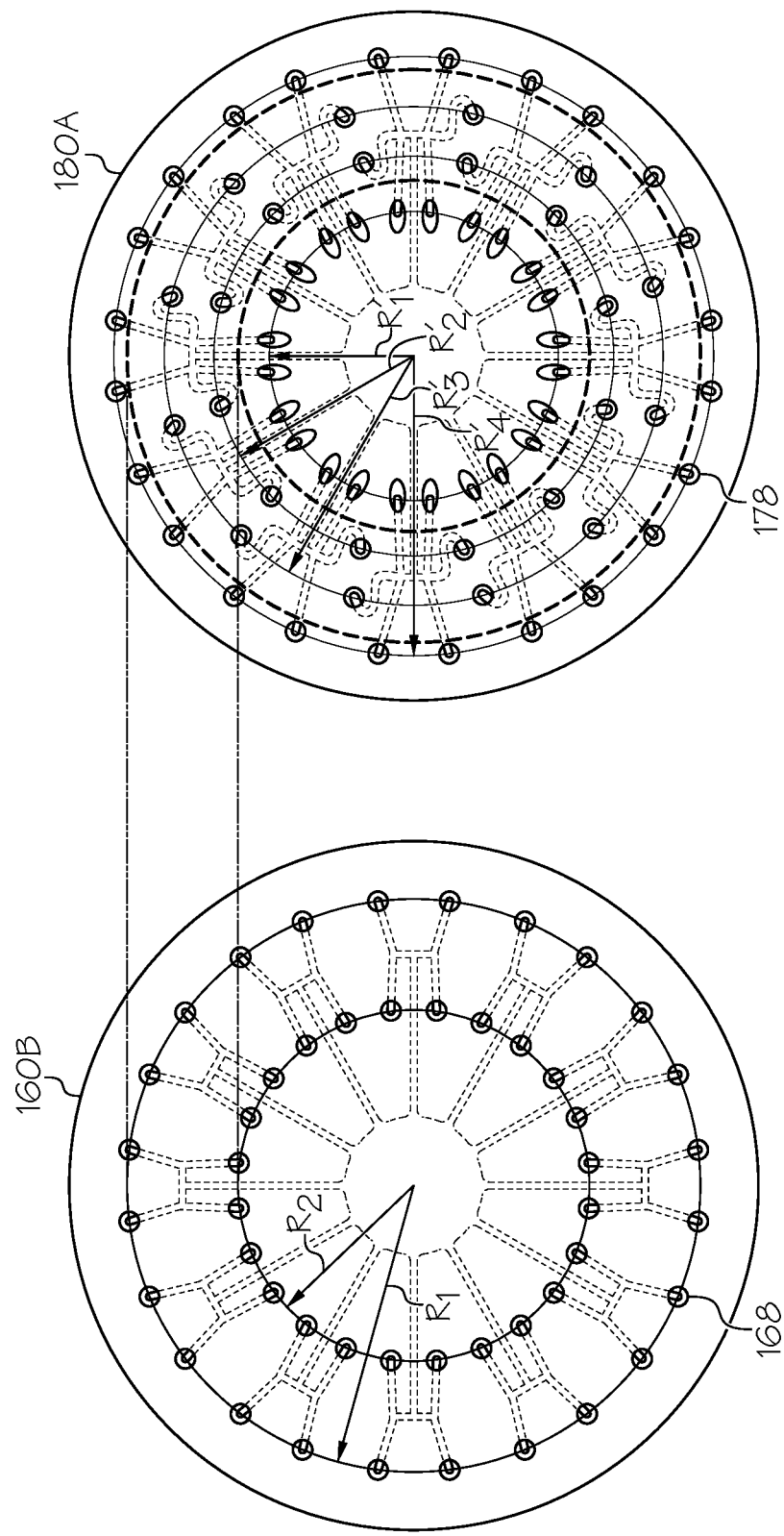
FIG. 19 depicts the relationship between the openings in a second plate of a flow distributor with respect to the openings in a first plate of a flow collector in another embodiment of a mixer.

In another embodiment (Embodiment C), a mixer is constructed using a flow distributor as shown in FIGS. 16A and 16B and a flow collector as shown in FIGS. 18A and 18B. Thus, the flow distributor includes 48 openings 168 adjacent to the upstream side of the mixing disk while the flow collector includes 72 openings 188 at the downstream side of the mixing disk. FIG. 19 illustrates the relationship between the openings 168 in the second plate 160B of the flow distributor with respect to the openings 178 in the first (upstream) plate 180A of the flow collector in a mixer constructed in this manner. It can be seen that the concentric circles of radii $R_1$ and $R_2$ on which the openings 168 are defined are different from the concentric circles of radii $R_1'$, $R_2'$, $R_3'$ and $R_4'$ on which the openings 178 are defined.

In yet another embodiment (Embodiment D), a mixer is constructed using a flow distributor as shown in FIGS. 18A and 18B and a flow collector formed according to the structure shown in FIGS. 16A and 16B. In this arrangement, the flow distributor includes 72 openings 188 adjacent to the upstream side of the mixing disk and the flow collector includes 48 openings 168 at the downstream side of the mixing disk. As with Embodiment C, the concentric circles for the openings 168 and 178 are different.

An evaluation of performance was made using a pulse input of an analyte to determine the retention time distribution for mixers according to Embodiments A to D. Measurement results showed that Embodiment B has a higher peak and a marginally narrower width in its retention time distribution relative to that for Embodiment A. Embodiments C and D had nearly identical retention time distributions with peaks heights similar to that of Embodiment B; however, Embodiments C and D had retention time distributions with better symmetry.

It should be recognized that the number of internal flow paths and/or openings may be different from those described above. For instance, any flow splitting ramification having a number of fractal steps greater than two may be used. For example, two or more flow splitting disk elements may be stacked. Similarly, the arrangement of the internal flow paths and openings may be different. For example, the openings may be arranged on a different number of concentric circles. Other arrangements of openings are contemplated.

Methods are also contemplated of mixing fluid. Methods include providing a compositional solvent stream, by at least one fluidic pump such as the pump 12, to a mixer arrangement, such as the mixer arrangement 100, that includes a first frequency targeting mixer, such as the frequency targeting mixer 30, and a residual noise targeting mixer, such as the residual noise targeting mixer 50. Methods include receiving, by the first frequency targeting mixer, the compositional solvent stream and reducing or eliminating, by the first frequency targeting mixer, fluidic compositional oscillations in a compositional solvent stream that depart from a desired composition at a first target frequency, such as a frequency corresponding to a full stroke volume of the pump. Methods include receiving the fluid by the residual noise targeting mixer fluidically connected in series to the frequency targeting mixer, and dampening, by the residual noise targeting mixer, aperiodic residual baseline noise in the compositional solvent stream.

Methods still further include providing a second frequency targeting mixer, such as the frequency targeting mixer 40, fluidically connected in series to the first frequency targeting mixer, and receiving, by the second frequency targeting mixer, the compositional solvent stream, and reducing or eliminating, by the second frequency targeting mixer, fluidic compositional oscillations in the compositional solvent stream that depart from a desired composition at a second target frequency that is different than the first target frequency, such as a low frequency noise that remains downstream after the first frequency targeting mixer.

While the invention has been shown and described with reference to specific embodiments, it should be understood by those skilled in the art that various changes in form and detail may be made therein without departing from the spirit and scope of the invention as recited in the accompanying claims. For example, in some embodiments, the removable seal device may not include a support sleeve, or may include a support sleeve that is not made of a metallic material. Other variations are contemplated without departing from the scope of inventions described herein.

What is claimed is:

1. A mixer arrangement for use in a chromatography system comprising:
    a first frequency targeting mixer including a first flow channel coupled between an inlet and an outlet and a second flow channel coupled between the inlet and the outlet, the second flow channel including a volume offset region configured to delay fluid propagation through the second flow channel, wherein the volume offset region is configured to reduce or eliminate fluidic compositional oscillations in a compositional solvent stream that depart from a desired composition at a first target frequency; and a residual noise targeting mixer fluidically connected in series to the frequency targeting mixer, the residual noise targeting mixer configured to dampen aperiodic baseline noise in the compositional solvent stream.

2. The mixer arrangement of claim 1, further comprising:
a second frequency targeting mixer including a first flow channel coupled between an inlet and an outlet and a second flow channel coupled between the inlet and the outlet, the second flow channel including a volume offset region configured to delay fluid propagation through the second flow channel, wherein the volume offset region is configured to reduce or eliminate fluidic compositional oscillations in the compositional solvent stream that depart from a desired composition at a second target frequency that is different than the first target frequency, and wherein the second frequency targeting mixer is fluidically connected in series to the first frequency targeting mixer.

3. The mixer arrangement of claim 1, wherein the residual noise targeting mixer includes a dispersion structure having a plurality of flow channels creating flow direction anisotropy.

4. The mixer arrangement of claim 3, wherein the residual noise targeting mixer includes a mixing disk having an inlet face and an outlet face located between the plurality of flow channels, wherein the mixing disk includes a dispersive medium having a random porous structure.

5. The mixer arrangement of claim 1, wherein the residual noise targeting mixer is located in a downstream arrangement relative to the first frequency targeting mixer.

6. The mixer arrangement of claim 1, wherein the first flow channel of the first frequency targeting mixer includes a first flow restrictor region having a hydraulic resistance substantially representing the hydraulic resistance of the first flow channel, and wherein the second flow channel includes a second flow restrictor region fluidically connected in series with the volume offset region, the second flow restrictor region having a hydraulic resistance substantially representing the hydraulic resistance of the second flow channel.

7. The mixer arrangement of claim 1, wherein the volume of the residual noise targeting mixer is between 1 and 2 times the noise volume of the aperiodic baseline noise in the compositional solvent stream.

8. A fluid chromatography system comprising:
at least one solvent reservoir;
at least one pump connected to the at least one solvent reservoir configured to pump a compositional solvent stream from the at least one solvent reservoir downstream;
a mixer arrangement located downstream from the at least one pump, the mixer arrangement including:
a first frequency targeting mixer including a first flow channel coupled between an inlet and an outlet and a second flow channel coupled between the inlet and the outlet, the second flow channel including a volume offset region configured to delay fluid propagation through the second flow channel, wherein the volume offset region is configured to reduce or eliminate fluidic compositional oscillations in a compositional solvent stream that depart from a desired composition at a first target frequency; and
a residual noise targeting mixer fluidically connected in series to the frequency targeting mixer, the residual noise targeting mixer configured to dampen aperiodic baseline noise in the compositional solvent stream;
a sample injector downstream from the mixer arrangement configured to inject a sample into the outlet flow of the solvent;
a chromatography column downstream from the sample injector configured to perform separation of the sample; and
a detector downstream from the chromatography column.

9. The fluid chromatography system of claim 8, wherein the first target frequency is a high frequency noise related to a full stroke volume of the at least one pump.

10. The fluid chromatography system of claim 9, wherein the volume offset region of the first frequency targeting mixer is approximately one quarter of the full stroke volume of the at least one pump.

11. The fluid chromatography system of claim 10, the mixer arrangement further comprising:
a second frequency targeting mixer including a first flow channel coupled between an inlet and an outlet and a second flow channel coupled between the inlet and the outlet, the second flow channel including a volume offset region configured to delay fluid propagation through the second flow channel, wherein the volume offset region is configured to reduce or eliminate fluidic compositional oscillations in the compositional solvent stream that depart from a desired composition at a second target frequency that is different than the first target frequency, and wherein the second frequency targeting mixer is fluidically connected in series to the first frequency targeting mixer.

12. The fluid chromatography system of claim 11, wherein the second frequency targeting mixer is fluidically connected downstream from the first frequency targeting mixer and upstream from the residual noise targeting mixer, and wherein the second target frequency is a low frequency residual noise that remains after the first frequency targeting mixer reduces or eliminates fluidic compositional oscillations.

13. The fluid chromatography system of claim 12, wherein the residual noise targeting mixer is configured to dampen aperiodic baseline noise in the compositional solvent stream by at least one of:
smoothing residual noise related to the high frequency noise corresponding to the full stroke volume of the at least one pump; and
further dampening the amplitude of the low frequency residual noise.

14. The fluid chromatography system of claim 13, wherein the residual noise targeting mixer includes a dispersion structure having a plurality of flow channels creating flow direction anisotropy.

15. The fluid chromatography system of claim 14, wherein the residual noise targeting mixer includes a mixing disk having an inlet face and an outlet face located between the plurality of flow channels, wherein the mixing disk includes a dispersive medium having a random porous structure.

16. The fluid chromatography system of claim 8, wherein the residual noise targeting mixer is located downstream from the first frequency targeting mixer.

17. The fluid chromatography system of claim 8, wherein the first flow channel of the first frequency targeting mixer includes a first flow restrictor region having a hydraulic resistance substantially representing the hydraulic resistance of the first flow channel, and wherein the second flow channel includes a second flow restrictor region fluidically connected in series with the volume offset region, the second flow restrictor region having a hydraulic resistance substantially representing the hydraulic resistance of the second flow channel.

18. The fluid chromatography system of claim 8, wherein the volume of the residual noise targeting mixer is between 1 and 2 times the full stroke volume of the at least one pump.

19. A method of mixing fluid in a fluid chromatography system comprising:
    providing a compositional solvent stream, by at least one fluidic pump, to a mixer arrangement that includes a first frequency targeting mixer and a residual noise targeting mixer;
    receiving, by the first frequency targeting mixer, the compositional solvent stream;
    reducing or eliminating, by the first frequency targeting mixer, fluidic compositional oscillations in a compositional solvent stream that depart from a desired composition at a first target frequency;
    receiving the fluid by the residual noise targeting mixer fluidically connected in series to the frequency targeting mixer; and
    dampening, by the residual noise targeting mixer, aperiodic residual baseline noise in the compositional solvent stream.

20. The method of claim 19, wherein the mixer arrangement further includes a second frequency targeting mixer fluidically connected in series to the first frequency targeting mixer, the method further comprising:
    receiving, by the second frequency targeting mixer, the compositional solvent stream; and
    reducing or eliminating, by the second frequency targeting mixer, fluidic compositional oscillations in the compositional solvent stream that depart from a desired composition at a second target frequency that is different than the first target frequency.

* * * * *